US012220933B2

(12) United States Patent
Franken et al.

(10) Patent No.: US 12,220,933 B2
(45) Date of Patent: Feb. 11, 2025

(54) METHOD FOR PRINTING AND IDENTIFYING AUTHENTICATION MARKS BY MEANS OF AN AMPLITUDE-MODULATED RASTER PRINT

(71) Applicant: U-NICA SYSTEMS AG, Landquart (CH)

(72) Inventors: Klaus Franken, Igis (CH); Sergei Startchik, Geneva (CH)

(73) Assignee: U-NICA SYSTEMS AG, Landquart (CH)

( * ) Notice: Subject to any disclaimer, the term of this patent is extended or adjusted under 35 U.S.C. 154(b) by 0 days.

(21) Appl. No.: 18/036,514

(22) PCT Filed: Nov. 11, 2021

(86) PCT No.: PCT/EP2021/081408

§ 371 (c)(1),
(2) Date: May 11, 2023

(87) PCT Pub. No.: WO2022/101355

PCT Pub. Date: May 19, 2022

(65) Prior Publication Data

US 2023/0398805 A1 Dec. 14, 2023

(30) Foreign Application Priority Data

Nov. 12, 2020 (EP) .................................... 20207154

(51) Int. Cl.
*B42D 25/20* (2014.01)
*B42D 25/305* (2014.01)
(Continued)

(52) U.S. Cl.
CPC ........... *B42D 25/20* (2014.10); *B42D 25/305* (2014.10); *B42D 25/378* (2014.10); *B42D 25/48* (2014.10); *G07D 7/202* (2017.05)

(58) Field of Classification Search
CPC .... B42D 25/20; B42D 25/305; B42D 25/378; B42D 25/48; G07D 7/202
(Continued)

(56) References Cited

U.S. PATENT DOCUMENTS 10,065,441 B2 9/2018 Falkenstern et al.
10,127,623 B2 11/2018 Lyons et al.
(Continued)

FOREIGN PATENT DOCUMENTS

DE 102018115146 A1 12/2019
EP 3686027 B1 7/2021
WO WO-2020152099 A1 * 7/2020 ............. B42D 25/21

*Primary Examiner* — Justin V Lewis
(74) *Attorney, Agent, or Firm* — The Webb Law Firm

(57) ABSTRACT

A method of printing a digital image includes printing authentication marks by applying an amplitude modulated raster print in a detection zone to an object, the printed area of the detection zone consisting of asymmetric raster dots, wherein at least two mutually non-parallel finder edges are printed from at least one finder zone to determine the position, boundary and orientation of the detection zone. A method of authenticating such a print includes capturing an image of the printed article; detecting the at least two finder edges to determine the detection zone from the image with halftone dot accuracy, comparing the captured print image of the detection zone with the resulting print images, and deciding on the basis of the comparison whether there is an original print on the article.

20 Claims, 21 Drawing Sheets

(51) Int. Cl.
*B42D 25/378* (2014.01)
*B42D 25/48* (2014.01)
*G07D 7/202* (2016.01)

(58) Field of Classification Search
USPC .................... 283/67, 70, 72, 74, 94, 98, 901
See application file for complete search history.

(56) References Cited

U.S. PATENT DOCUMENTS

| | | | |
|---|---|---|---|
| 10,270,936 B2 | 4/2019 | Bai et al. | |
| 11,587,339 B2 | 2/2023 | Kaufmann et al. | |
| 2022/0150378 A1* | 5/2022 | Franken ............... | B42D 25/405 |

* cited by examiner

METHOD FOR PRINTING AND IDENTIFYING AUTHENTICATION MARKS BY MEANS OF AN AMPLITUDE-MODULATED RASTER PRINT

CROSS REFERENCE TO RELATED APPLICATIONS

This application is the United States national phase of International Patent Application No. PCT/EP2021/081408 filed Nov. 11, 2021, and claims priority to European Patent Application No. 20207154.4 filed Nov. 12, 2020, the disclosures of which are hereby incorporated by reference in their entireties.

BACKGROUND OF THE INVENTION

Field of the Invention

The present invention relates to a printing method and authentication method for a print of a digital image to be produced, comprising a method of printing authentication marks by applying an at least amplitude modulated halftone print in a detection zone to an object, the printed area of the detection zone comprising contiguous halftone cells, in each of which halftone cells a halftone dot is printed from a matrix of printable halftone elements. It also relates to verification of an original print produced by means of such a halftone printing method.

Description of Related Art

A significant part of global counterfeiting crime is the copying and impersonation of printed documents and packaging. This affects not only government ID documents such as passports, identity cards, etc., but also documents related to the proof of origin of commercial products. These include certificates, accompanying documents, proof of origin and, to a large extent, packaging of branded products. The widespread distribution of the products, i.e. the size of their markets and the expected profits for a counterfeiter are motivating factors. Accordingly, especially well-known brands with a high-quality promise and thus a high retail price or street price suffer as targets of counterfeiting crime. Practically all branches of industry in the field of consumer and industrial goods are affected; well-known examples are spare parts for passenger cars, watches and medicines. Basically, all types of packaging are affected, such as blister packs, cardboard packaging, hard packaging (cans, etc.), especially those whose designs can be reproduced by a printing process such as offset, flexo or digital printing. The quality of the counterfeited packaging is good to very good in some cases, whereby a good counterfeit is one that does not catch the eye of a consumer or service employee at first glance, but only in direct comparison with the original. A very good counterfeit can only be detected by the eye of a trained expert or even, in the case of specific investigations, only by a forensic examination. The faithful reproduction of packaging designs and other documents belonging to the original product is made easier with the easy availability of high performance scanners and the usually easily recognisable or communicated visual elements on e.g. packaging that prove the originality of the product. The exact execution of a logo in terms of its colours and its geometric dimensions, the function of a barcode or an imitated serial number are no obstacle for a counterfeiter. Considering the fact that in the end consumer markets counterfeit products are often put into circulation only a few days after the new release of a product, shows on the one hand the efficiency of organised counterfeiting crime and on the other hand the still very inadequate measures to protect branded products. There is thus a great need for copy protection features of printed original packaging and documents, the verification of which is robust and reliable as well as associated with a justifiable effort. In terms of the effort involved in verification, a forensic laboratory examination would not be justifiable as an example. Original manufacturers, industrial customers and consumers rather demand quick examinations with ubiquitous means, which usually amounts to verification with a smartphone and suitable application programs (app).

Digital watermarks can serve as copy protection to a certain extent, although they are primarily designed to protect information embedded in an image. If the message (a "content") embedded in the object, e.g. in an image, is to be extracted, a password or similar is required. A secure and at the same time reliable extraction of the message requires measures that are partly contradictory in terms of their effectiveness. For example, correction coding for redundant extraction of embedded information is a gateway for hacking attempts. The function of pure copy protection in the sense of original recognition (copy detection) is not necessarily achievable with digital watermarks; especially not if the original print consists of a photographic image whose quality must not be reduced by integrated protection measures. In contrast, an additional embedded message is subordinate, although advantageous in some use cases. Some examples of digital watermarks consist, for example, in the exploitation of a lenticular structure on the data carrier (U.S. Pat. No. 10,065,441 B1), the alteration of the colour tone by incrementally changing the amount of colour (U.S. Pat. No. 10,127,623 B1), the replacement of a special colour (such as Pantone) by the basic colours of a colour system (such as CMYK) (U.S. Pat. No. 10,270,936 B1) or other types of modulation of the printed image which, on closer inspection, constitute a visible intervention in the design.

In principle, an original can be recognised by digital fingerprinting, as the copy of an original print always differs from the original to a small extent, unless it is a so-called total forgery produced by the manufacturer or a packaging service provider or printer certified by the manufacturer (so-called 3rd shift or night shift forgeries). The causes lie in the flow of the printing ink, the ink absorption by the paper used, etc. Ordinary "content fingerprinting" of object features is not very robust and has high error rates. In addition, original recognition via digital fingerprinting requires large IT resources and thus leads to relatively slow verification procedures. Total counterfeits can be largely ruled out with additional functions, e.g. with an imprinted time stamp in conjunction with a serial number affixed to the packaging. Such an additional function is more suitable for an investigative verification of originality in a second step.

EP 3 686 027 A1 describes a method for printing authentication marks by applying an at least amplitude modulated halftone print in a detection zone to an object. This method uses adjacent halftone cells, in each of which a halftone dot is printed from a matrix of printable halftone elements, whereby individual tone values of the halftone print each correspond to a halftone level of a halftone mountain for a halftone dot. In this process, the assigned halftone level of the halftone mountain is modified in the detection zone in a predetermined manner for a plurality of tone values of halftone dots to be printed, so that a predetermined matrix image of the halftone elements to be printed is assigned to it while the tone value of the print remains constant.

DE 10 2018 115146 A1 concerns a method for producing security elements in an image that are invisible to the human eye and cannot be copied, in particular for checking the authenticity of images, wherein the image is imaged by means of a printing grid, wherein the printing grid consists of individual pixels. At least one field is defined in the print raster, wherein by means of manipulation of pixels in the field and/or by means of manipulation of the entire field, non-copyable encrypted information is deposited for comparison with at least one database. The image thus has at least one non-copyable security element, wherein the image has evaluable information within its print raster in such a way that the image has at least one field which has a manipulation of the pixels which is not visible to the human eye and/or a manipulated field which is not visible. The alteration of the halftone/raster is achieved by, for example, exchanging the halftone angle between two or more colours, changing the halftone angle of at least one colour, changing the running width or halftone frequency of the cross-line halftone of at least one colour, changing the frequency or amplitude in the case of frequency-modulated halftones of at least one colour, changing the amplitude or frequency in the case of amplitude-modulated halftones of at least one colour.

SUMMARY OF THE INVENTION

Based on this state of the art, there is a need for a relatively simple printing and downstream copy detection method that

- does not affect the quality of a photographic image on a document or packaging,
- hides picture elements that serve the original recognition from the unarmed eye,
- is also suitable for colour images,
- can be carried out with a smartphone,
- avoids unreasonable effort (tripod, lighting, long waiting times, complex operation) or does not require such effort.

This task is solved with a halftone printing method described herein.

Known methods for reading information require, like the QR code, in addition to at least one detection zone in which the information to be read is contained, at least one finder zone with which the existence, position, orientation of the detection zone can be determined. This can be done, as in the case of an EAN scanner or even a QR code, partly by user guidance, in that the user holds the recording device with which the information is photographed from a support in such a way that the entire code area is recorded. Then, in the QR code, the orientation of the area printed with information is determined by predetermined markings. It is now a task of the present invention, in addition to hiding the information proving an original, to also provide the finder zone or finder zones necessary for finding this information in such a way that they are also not noticeable to the unarmed eye, while being recognisable for automatic machine detection in exactly the opposite way.

It is also essential here that these finder zones are not necessarily located at the edge of an image. Yes, it is precisely part of the invention that the edges of an image, even or especially if they only represent a transition to a white, here unprinted edge zone, e.g. of packaging, are not included in the final determination of a finder zone, since a white surface by definition has no detectable halftone dots.

The invention presented here solves the problem by representing picture elements with selected halftone dot shapes. The solution follows the fact that the printout of a digital original undergoes a change through the printing process itself, in which deviations are recognisable on a microscopic level. For example, the printing ink is not distributed exactly over the space on the image medium specified by the recorder elements (smallest printing elements, or rel for short). The size of the individually controllable exposure element is the exposure pixel. Its size results from the imagesetter resolution, it corresponds to the diameter of the laser dot; the higher the imagesetter resolution, the smaller the Rels.

The structure of the medium (paper, cardboard, coated board) and the flow behaviour of the ink favour this process, which leads to a widening and deformation of the halftone dots. A scan and further printing based on the scan adds further blurring to the print image of the copy, which, given a suitable digital template, is recognisably different from the original print in that an image capture device such as a smartphone camera with suitable software can distinguish precisely this copy from the original print. It is of particular interest that suitable microscopic elements are not added to the image as an independent graphic, but are part of the image composition. At this point, it is a good idea to replace standard round, square-round or ellipsoidal halftone dots with halftone dots of more significant shapes. For example, a round halftone dot will not change its shape significantly during printing, whereas a, for example, U-shaped halftone dot 1, as shown in FIG. 1A, or an L-shaped halftone dot 4, as shown in FIG. 1B, will appear microscopically as a somewhat different printed image 2 or 5, respectively, with the same number of printing recorder elements. A copy of the original print, shown here on the right as the third image in FIG. 1A or 1B, in turn has a shape 3 or 6 at the same halftone dot, which hardly resembles a U or L. It is remarkable that the differences in the shape of the halftone dot elude the unaided eye of the observer as long as the halftone dot does not change the size of its area and thus the halftone value it represents. In other words, the qualitatively “good” copy of an original print produced by a halftone printing process carried out according to the invention has the same grey value and appears the same to the unaided eye. The same is true for colour prints where a predetermined colour of the usually four colour layers applied at different halftone angles has been printed using the procedure according to the invention. Usually, the colour selected for this is the top or second top colour, i.e. the colour layer printed last or as the second to last.

The objects composed of the halftone dots, on the other hand, are transferred in the copy in apparently similar quality to the original, as is shown by the transformation of the digital original of a character 1 or 4 to its appearance in the original print 2 or 5 or in the copy of the original print 3 or 6. It is part of the present invention to present a method which makes it possible, on the one hand, to detect the characteristic microscopic alteration of the digital original during the first printing and, on the other hand, to evaluate the alterations which the copy undergoes in relation to the original as a criterion for excluding the proof of originality. It is also part of the invention that cameras on common smartphones with dedicated software are sufficient to detect the necessary microscopic subtleties on the printed image. The method of the present invention can also be applied to colour prints. The method presented is particularly aimed at protecting original products against counterfeiting.

The method of printing and authenticating a print to be made of a digital image according to the invention comprises printing authentication marks by applying an amplitude modulated halftone print in a detection zone to an object, the printed area of the detection zone consisting of asymmetric halftone dots, at least two mutually non-parallel finder edges of at least one finder zone being printed to determine the position, boundary and orientation of the detection zone, and a method of authenticating such a print comprising providing an image capture device having a microprocessor for executing an authentication program, providing the resulting print images predetermined from the print data for a predetermined number of halftone dots of the printed object from a detection zone, and providing a computer program for comparing the print images predetermined from the halftone dot data; the method comprising capturing an image of the printed article; detecting the at least two finder edges to define the detection zone from the image with halftone dot accuracy, comparing the captured print image of the detection zone with the resulting print images, and deciding on the basis of the comparison whether or not an original print is present on the printed article.

Advantageously, each finder edge along a predetermined path of the printed image consists of adjacent rows of halftone dots, the difference between the halftone dots of the adjacent rows being selected from the group comprising symmetrical halftone dots versus asymmetrical halftone dots, predetermined different halftone angles of the halftone dots, AM modulation versus FM modulation of the halftone dots, said difference from the group being predeterminable to be independently different or the same for each finder edge. In other words, one finder zone can be determined by the difference between symmetrical halftone dots versus asymmetrical halftone dots (as shown in FIG. 12), while another finder edge is determined by the difference of AM modulation versus FM modulation of the halftone dots in the rows on either side of the finder edge. If the two finder edges are assigned to the same finder zone, there must be compatibility of the finder zone side areas.

The difference between the halftone dots of the adjacent rows of a finder edge can also include different AM modulation of the halftone dots on both sides of the finder edge. The difference of the AM modulation can be realised in particular in the amplitude or the frequency of the two AM modulations, possibly of at least one colour.

Thus, a finder zone defined by a finder edge may have asymmetric halftone dot shapes, with the halftone dots existing beyond said finder zone on the other side of said finder edge each forming a zone of symmetric halftone dot shapes from the remaining printed image.

Alternatively, a finder zone defined by a finder edge may have symmetrical halftone dot shapes, with the halftone dots existing beyond said finder zone on the other side of said finder edge each forming a zone with asymmetrical halftone dot shapes from the remaining printed image or from the detection zone.

Further alternatively, a finder zone defined by a finder edge may have symmetrical halftone dot shapes with a first halftone angle, each adjoining a zone with a second halftone angle from the remaining printed image or from the detection zone beyond said finder zone on the other side of said finder edge (the first and second halftone angles being different from each other).

The predetermined number of asymmetric halftone dots in the detection zone may be arranged in a matrix of at least two rows and two columns; the examples shown assume at least three rows and a length of 10 or more halftone dots, but in principle a smaller number is possible. In other words, the predetermined number of halftone dots in the detection zone may be divided into zones with asymmetric and symmetric halftone dot structure, these zones being arranged in a matrix of at least two rows and two columns.

The asymmetrical halftone dots can be provided in one of the last two colour jobs to be printed, which are most visible and evaluable, in a multi-colour print.

Also, in the case of colour printing, the finder edges can then be provided by defining halftone dot shapes and/or halftone angles of an identical or a different colour layer. Advantageously, the asymmetric halftone dots to be evaluated have a grey tone value between and 75%. The same applies to the symmetrical halftone dots, although smaller and higher values up to 100% are also possible there.

At least two finder edges may meet in a corner point of a finder zone so that a finder zone is directly identified, or finder edges of one or more finder zone(s) are provided at the edge of the printed image or in at least one pair of intersecting finder zone strips.

In the method of printing authentication indicia by applying an amplitude modulated halftone print in a detection zone, a matching template can be generated based on print data selected from the group consisting of print substrate data, print ink data and print guide data.

Advantageously, this basis for comparison is then trained by original prints and print proofs, whereby optionally the captured image of the printed object undergoes a conversion of the image by a graph algorithm into the format of the basis for comparison for a direct comparison in the procedure for authentication.

Then, preferably, capturing the image of the printed object in the authentication process may comprise capturing a plurality of images with different camera parameters selected from the group consisting of varying the focus and varying the exposure time to produce an image stack, the data of which is converted into an aligned image stack; to be subsequently converted into the format of the basis of comparison. This allows the resolution to be increased so that simpler cameras of mobile communication devices can be used more easily.

The distribution of the finder zones and the detection zone(s) is provided in a predetermined matrix containing digital information.

The detection zone may be checked against the basis of comparison based on the recorder elements composing the grid points therein, and the comparison may include a threshold of corresponding matches of detected recorder elements with the recorder elements of the basis of comparison.

Advantageously, a plurality of separate detection zones is then provided, and either a total threshold value determined over all detection zones or individual threshold values of the individual detection zones are then used as a basis for decision-making.

Starting from a digital template of the halftone dots from the pre-print stage, a blurring step is switched on in which a blurred model is generated from the digital template based on the data from the group comprising the printing substrate, the printing ink and the printing guide. This can optionally be trained with a subsequent training step using original prints or proofs of the printed model for a trained model to create a matching template for an image analysis of a selected section of the printed image to be checked, whereby a matching of matching template and the data set of the image to be authenticated provides the statement “original” or “copy” after applying a quality matrix.

A print to be checked can be translated into a dataset with the same architecture as the matching template using a graph algorithm, where optionally the mathematically formalised correspondence of the halftone pattern corresponds to a dense network of nodes and edges aligned with the halftone points of the print image.

Prior to the application of said graph algorithm, the detection of the print to be tested can be performed by generating a sequence of images with different camera parameters from the group comprising variation of the focus, in particular in non-equidistant steps, variation of the exposure time and variation of the camera position, wherein the obtained image stack is aligned in an alignment step to obtain an alignment vector field, wherein subsequently the further parameters varying between the images from the above mentioned group are determined to obtain a result which is processed with said graph algorithm.

BRIEF DESCRIPTION OF THE DRAWINGS

Preferred embodiments of the invention are described below with reference to the drawings, which are for explanatory purposes only and are not to be construed restrictively. The drawings show.

DESCRIPTION OF THE INVENTION

Figure 1A:
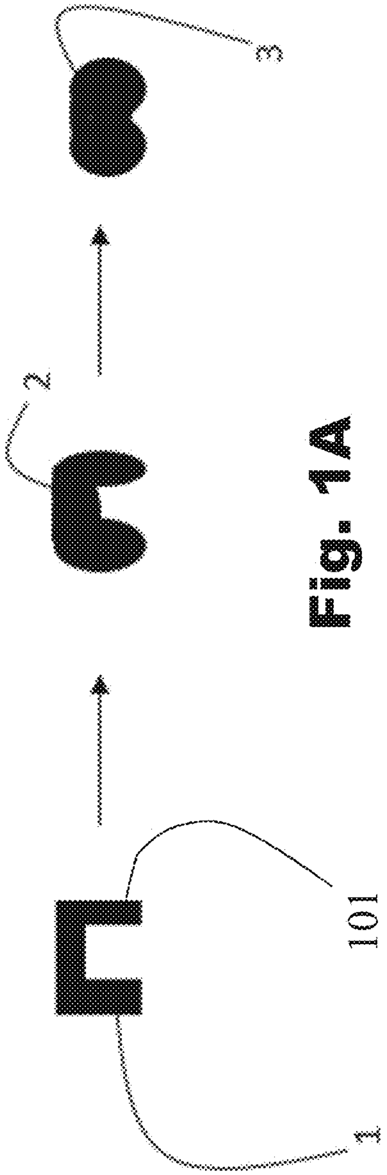
FIG. 1A a schematic representation of a halftone dot form for use in a printing process according to an embodiment of the invention and its printout as an original or copy, FIG. 1B a schematic representation of another halftone dot shape for use in a printing process according to an embodiment of the invention and its printout as an original or copy, FIG. 2A a schematic digital template of a matrix of 11×10 halftone cells with irregularly shaped halftone points of a size of 6×6 recorder elements, FIG. 2B a schematic digital template of a matrix of 48×24 halftone cells with halftone points of a size of 4×4 recorder elements, where eight detection zones are provided, FIG. 2C a photographic image with at least one area of irregularly shaped halftone dots.
Figure 1B:
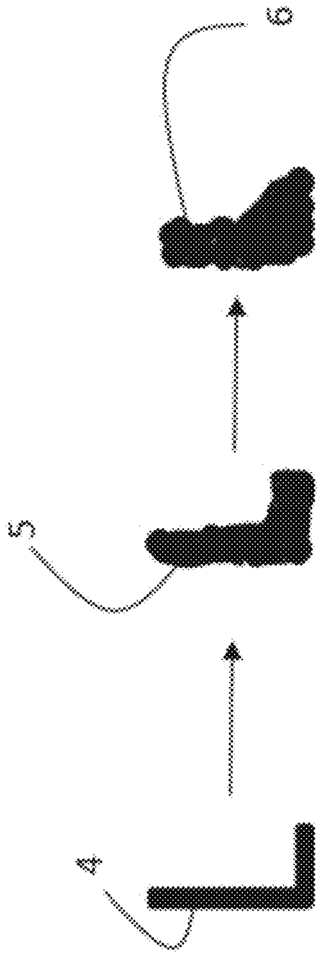
Figure 2A:
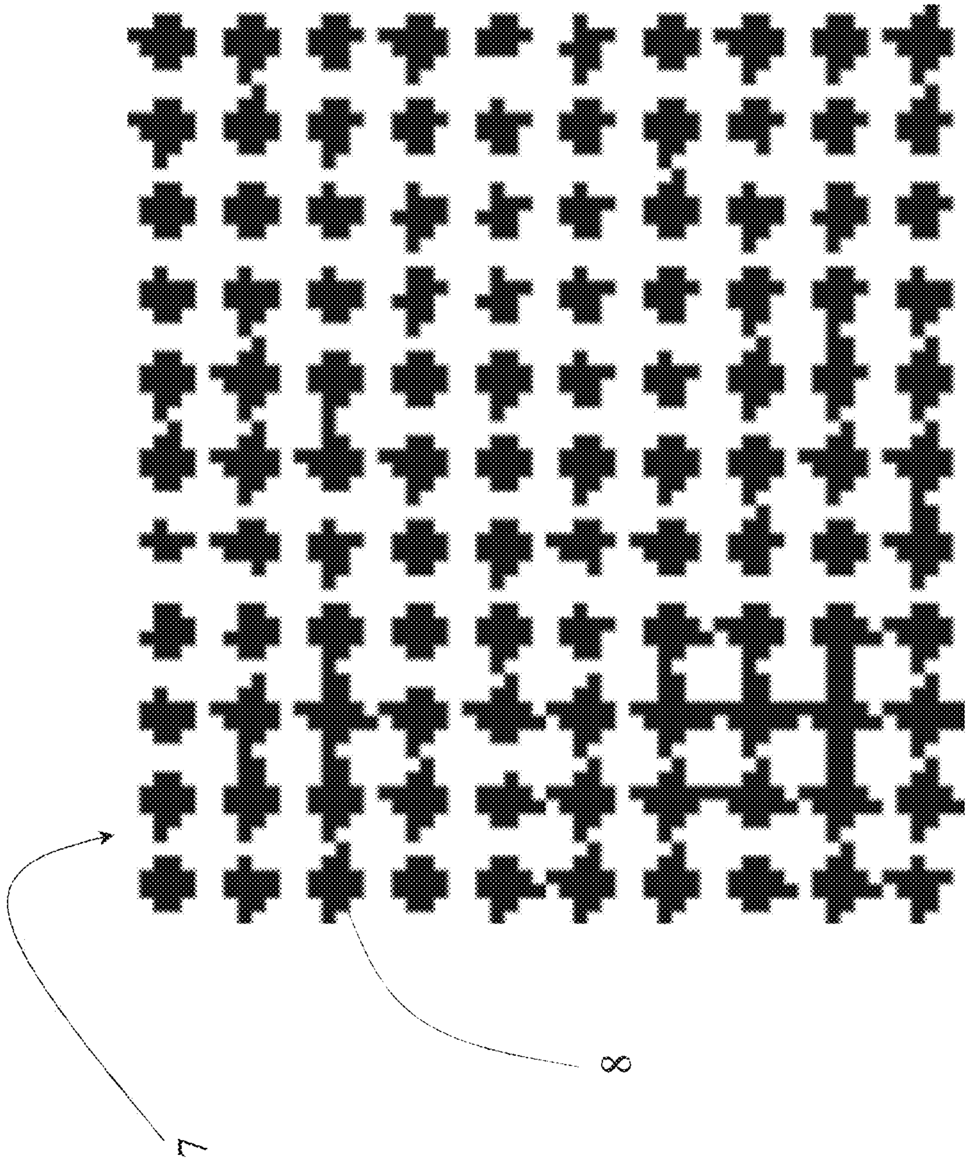
FIG. 2D a photographic image as digital image template (artwork)
FIG. 2E a photographic image as original print.
FIG. 2F a photographic image as a print of a scan of the original print, i.e. a copy, FIG. 3A a schematic representation of an image "without content representation" with individual zones, FIG. 3B a schematic representation of an image with individual decidedly arranged zones, FIG. 3C a schematic representation of an image with individual decidedly arranged zones, FIG. 3D another combination of zones with halftone points of different design with two braided strips, FIG. 3E another combination of zones with halftone points of different design with three times two braided strips, FIG. 3F a further combination of zones with halftone points of different design with a surrounding zone edge, FIG. 4A a photographic image with two sections of regular halftone points, FIG. 4B a photographic image with two sections of irregular halftone points, FIG. 4C a photographic image with a section of the image, FIG. 5A a photographic image with a section of the image.

FIG. 1A and FIG. 1B each show a schematic representation of a halftone dot form 1 or 4 for use in a printing process according to an embodiment of the invention and its printout as an original or copy. The halftone dot form 1, 4 may also be referred to as a digital original. The halftone dot must have a sufficient dimension of, for example, 8×8 or 12×12. Here, in connection with the explanation of the invention, a dimension of 6×6 is now assumed for FIG. 2A. FIG. 2A shows a schematic digital template of a matrix 7 of 11×10 halftone cells with irregularly shaped grid dots 8 of a size of 6×6 recorder elements.

Selection criteria of halftone dot shapes can be of any nature, e.g. based on special or unusual halftone dot definitions in the Raster Image Process (RIP) machine used in the course of screening in pre-print. In this case, the shape of the halftone dots is necessarily linked to a certain tonal value. However, the halftone dot shapes can also be freely definable and only follow the rule that a halftone dot with a tone value of a certain number of printing recorder elements (also halftone elements=smallest printing parts of halftone dots), the shape of the halftone dot can otherwise be arbitrary. Arbitrarily shaped halftone dots can be created during layout, whereby the RIP is set up in such a way that the predefined halftone dots are adopted unchanged for the print template. The object of the present invention is not the creation of the halftone dots per se, but suggestions as to how, with the aid of their unusual geometric shapes, an original print can be distinguished in a simple manner from a copy of that print. Crucial to the execution of the invention is the way in which the specially designed halftone dots 8 can contribute to the tamper-evidence of an image. Proposals for the design of halftone dots per se are known, e.g. U.S. Pat. No. 8,456,699 B2 (growth of halftone dots (print dots or clustered dots) based on selected halftone elements (pixels)).

In the present invention, verification of the original is to be feasible with simple means, preferably a smartphone. The invention thus describes, as it were, an originality indicator integrated in the image, which is recognised by a smartphone with a corresponding application program. Another option is to combine the tamper-evident indicator with an embedded message, which is another advantage of the invention.

The tamper-evident indicator consists essentially of an accumulation 7 of preferably apparently randomly shaped halftone dots 8. This accumulation 7 or matrix is placed on a zone of predetermined size at a predetermined location in the base image. The base image is, like later image 26 of FIG. 4A or image 33 of FIG. 4C or image 34 of FIG. 5A, a printed surface intended for the viewer of the package, for example. Outside the base image there is usually an unprinted area. The base image 210 of FIG. 12, on the other hand, has a border 213. Several zones may be integrated at different locations in the base image. All halftone dots in the base image outside the zones may have a shape customary for amplitude modulated halftone printing (AM halftone printing), for example round or elliptical, but do not have to. The procedure described here can also be applied to mixtures of a frequency modulated (FM) and amplitude modulated (AM) halftone. However, the indication of the originality of the print can naturally only be carried out with picture elements (i.e. such accumulations 7) which are subject to an AM raster method or screening according to the invention. The indication zones do not necessarily have to consist of apparently randomly shaped halftone dots, but can also be constituted of halftone dots whose geometric shape differs significantly from the halftone dot structure of the base image, for example, it is conceivable that the surroundings of the identification zone consist of round halftone dots and the identification zone or detection zone consists of distinctly elliptically shaped halftone dots. The term "apparently arbitrarily" shaped halftone dots implies the fact that differently irregularly shaped halftone dots can be created in different ways. On the one hand, a purely stochastic calculation of the composition of the halftone dots consisting of printing halftone elements or recorder elements is conceivable as long as the number of printing halftone elements produces the desired tone or grey value. On the other hand, the irregularly shaped halftone dots can also be generated in a systematic way; an unorthodox parameterisation of the threshold values in the halftone image process as proposed in EP-A-3 686 027 is conceivable, for example.

The indication of the originality of the print can be carried out, as explained above, in particular only with picture elements (i.e. such accumulations 7 in one or more zones) which are subject to AM raster process or screening according to the invention. Halftone dots in the base image outside said zones may have a shape customary for amplitude modulated halftone printing (AM halftone printing), for example round or elliptical, but do not have to. This describes a process in which one (or each) finder edge has two zones of picture elements with different amplitude modulated (AM) screenings/halftone printing.

Figure 2B:
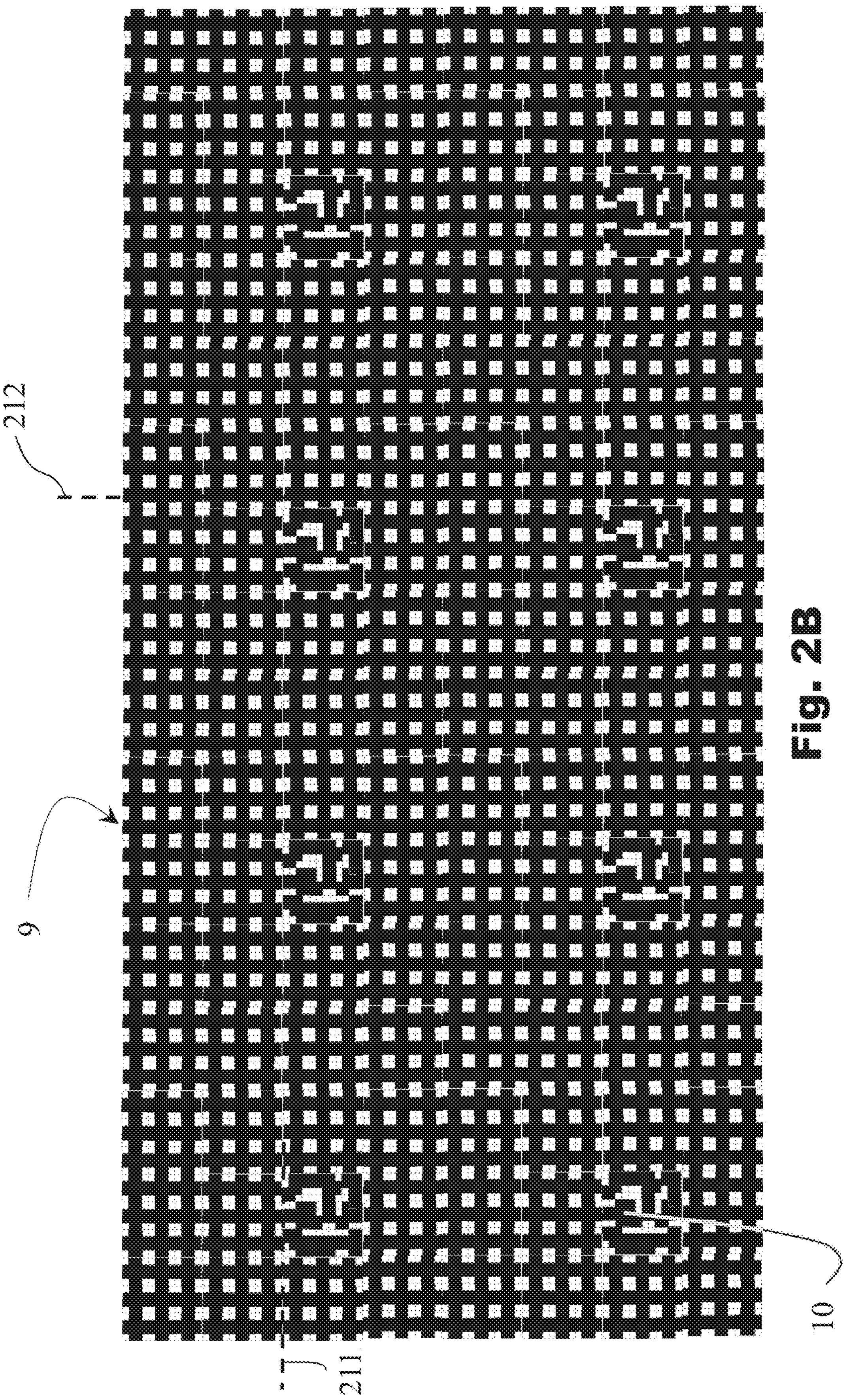

FIG. 2B shows a schematic digital template of a printed area or matrix 9 of 48×24 halftone cells with halftone dots of a size of 4×4 recorder elements, eight special sub-areas 10 being provided. Each raster cell contains twelve printing raster elements, corresponding to a colour coverage of 75%. Within the total area there are eight area elements, accumulations or special sub-areas 10 consisting of 3×3 halftone or raster cells with irregular/asymmetrical shaped raster elements, whereby the ink coverage on the sub-areas corresponds to the ink coverage on the total area. In other words, each special subarea 10 corresponds to the collection 7 of halftone dots of FIG. 2A. FIG. 2B creates a homogeneous surface 9 with a grey value of 75%, containing a total of eight sub-surfaces 10 with asymmetrically designed halftone dots. In this example, all eight partial areas 10 contain the same pattern; the raster cells are therefore designed the same way in all eight area elements. This is not necessarily required; the individual identification zones can be designed differently. It is also possible that some identification zones are designed the same and others follow a different pattern. The only rule for the design for each special sub-area is that the halftones of the image template are not changed. These special sub-areas 10 have a function as finder zone 19 or 20 (distinguished in FIG. 3A as orientation and synchronisation markings) or as detection zone 21. They can also combine both functions, i.e. finder zone 19/20 and detection zone 21, if the finder edges 211, 212 are realised in a detection zone. Separating the functions in different areas of the base image may speed up the detection of these special sub-areas 10 by the image 26, 33, 34 or 210 captured by a camera if there are several such areas, since a first such area can then be identified more quickly. Examples of finder edges 211, 212 are shown in FIG. 2B.

Figure 3A:
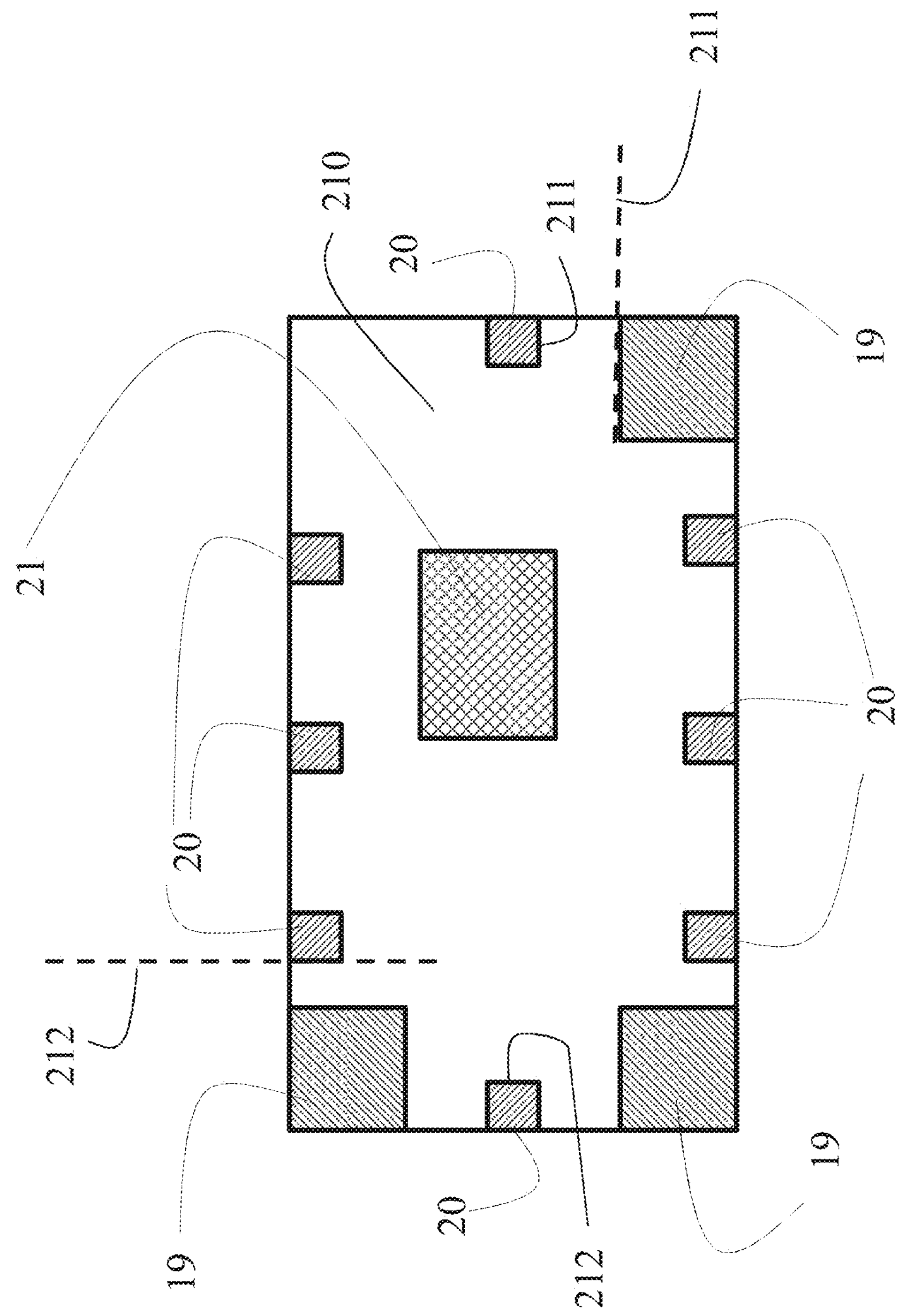

Advantageously, the special sub-areas 10 differ in their halftone structure from that of the surrounding base image 210. However, it may also be envisaged that the special sub-area detection zone 10 constitutes only part of the area printed with asymmetrically designed halftone dots and that only the one or more finder zones 19 or 20 are provided with, for example, symmetrical halftone dots. With brief reference to FIG. 3A, it is noted that the adjacent base image 210 may have just the screening of the detection zone 21. Essentially, there are at least two non-parallel finder edges 211 and 212 which are not necessarily associated with the same finder zone 19 or 20. These mutually non-parallel finder edges 211 and 212 are characterised by the fact that the raster structure within the finder zone 19 or 20 differs from the raster structure outside the finder zone 19 or 20, i.e. in the adjacent base image 210, it being possible for the detection zone 21 to be adjacent to one or more finder zones 19, 20. The finder edges 211 and 212 may be side edges of a finder zone 19, 20, 190, they may also be associated with different finder zones 19, 20, 190. There may also be several finder edges 211, 212, as shown in FIG. 3A by a reference to an edge of two zones 20 and with dashed lines to two edges of one zone 19 and another zone Advantageously, the length of at least one finder edge 19, 20, 190 can be determined. It then follows that from the analysis of various edges, the finder zone is known in its dimensions. At least one length of a finder edge should be known. In this respect, the dashed lines in FIG. 3A (and the other FIGS.) are only exemplary for the area covered by the finder zone. The dashed line indicated here as overlapping only shows the orientation, the finder edge is only the distance covered by the finder zone (distance in the mathematical sense, which means the length and undirected vector in relation to the position in 2D space).

The condition of non-parallelism of the finder edges 211, 212 to each other can also be called intersecting finder edges. This intersecting point can exist, for example, as a corner point of a finder zone 19 in the evaluation, although the image evaluation does not need to use this intersecting point as a corner point of a finder zone. This intersection point in the case of straight lines that are not parallel to each other can lie outside the image/print, since what is important here is a distance, in particular length next to the alignment, of this finder edge and not the recording of the intersection point itself. Nevertheless, an orthogonality of the finder edges 211, 212 to each other is preferred. Since this simplifies the determination of the position, boundary and orientation of the detection zone 21. In addition to the direct pixel-precise determination of the detection zone 21 from the finder edges 211, 212, one or more finder zones can also be determined first in order to then determine the detection zone 21 based on these. In the extreme case, there is only detection zone 21, two of whose edges are used as finder edges.

Figure 2C:
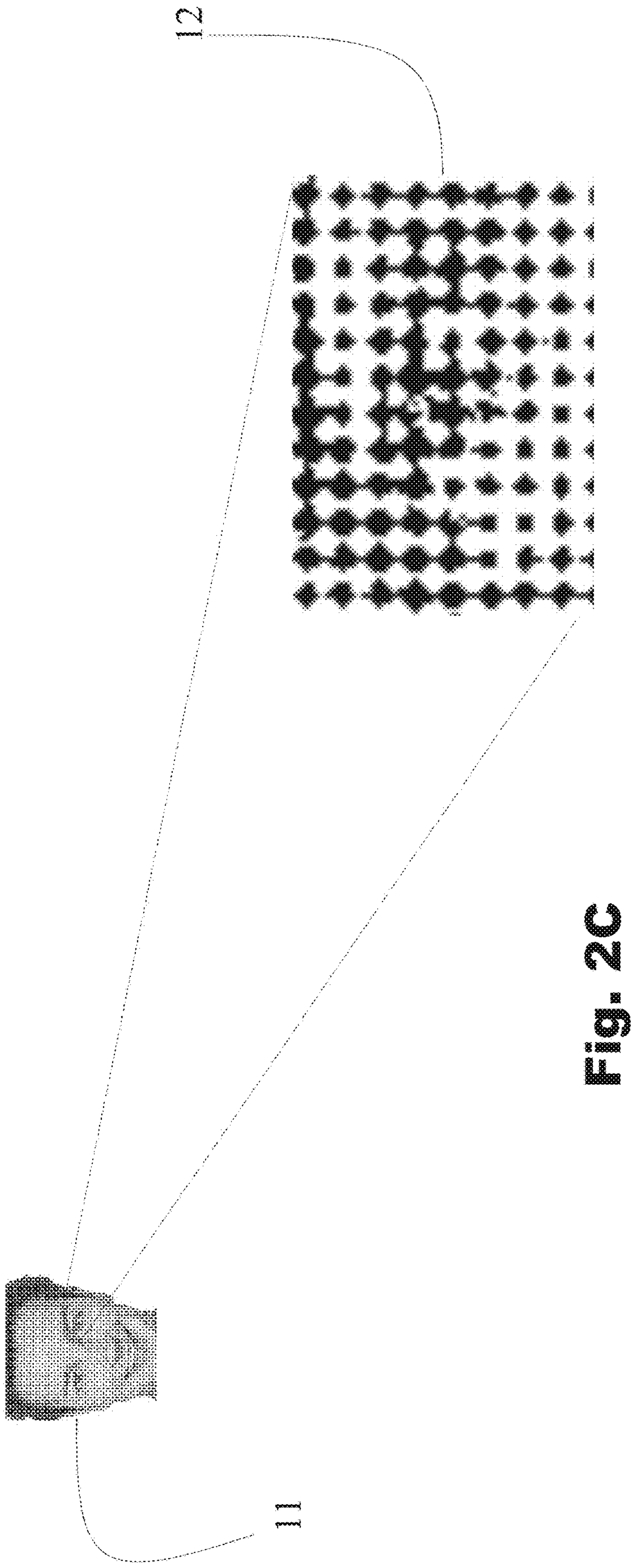

Finally, FIG. 2C shows a photographic image 11 with at least one area 12 of irregularly shaped halftone dots. This area 12 corresponds here to a detection zone. It could possibly also be a finder zone 19 or 20.

Figure 2D:
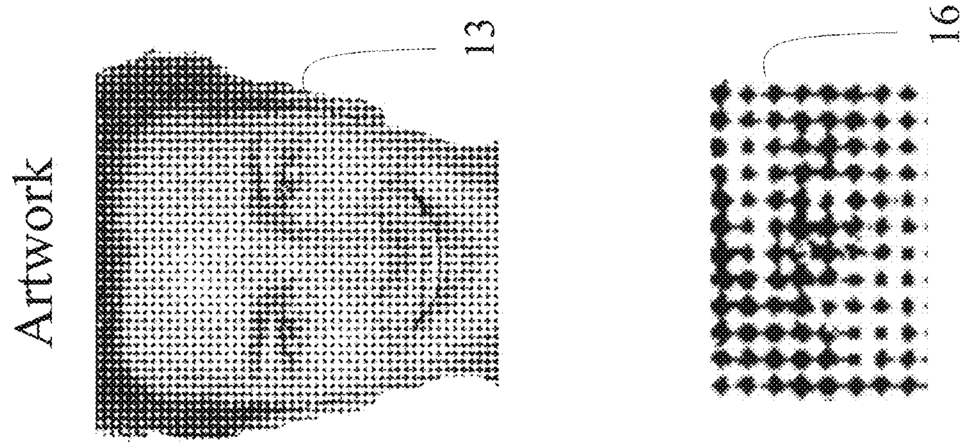
Figure 2E:
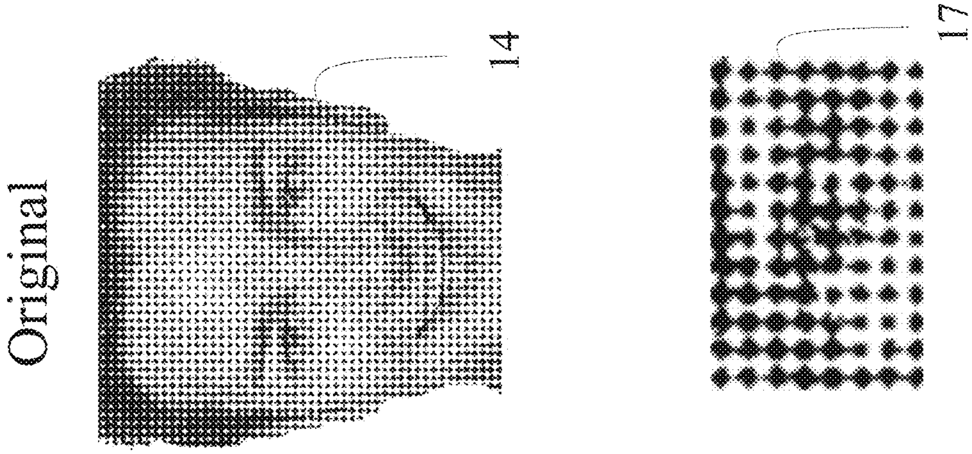
Figure 2F:
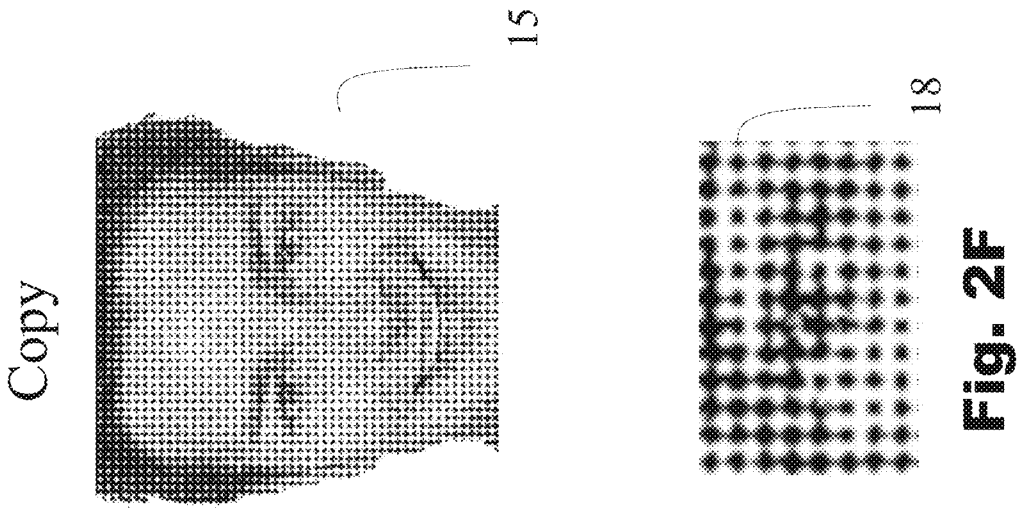

The change of the digital artwork via the original print to the print of a scan of the original print, i.e. the copy, is demonstrated in FIG. 2D for the example of a portrait image in the versions of the artwork or the digital artwork 13, the original 14 and its copy 15 as a scan of the original print 14, whereby in each case an enlarged section over 12×8 halftone dots of the right eye 16, 17 or 18 of the portrayed portrait again clearly documents the loss of the predefined design.

FIG. 3A now shows a schematic representation of an image "without content representation" with individual zones 19, 20 and 21. The functions of the identification zones can be of different nature. In particular, finder or start markers 19, which identify the position, boundary and orientation of the basic image, are to be distinguished from markers which serve to equalise the image. With the help of such markings (alignment markers) 20, strains, compressions, internal twists of the image can be corrected computationally so that a robust optical analysis of the image on a microscopic level is possible. These markings are to be understood as auxiliary zones whose task it is to present the image in a way that is suitable for the image analysis. Due to their microscopic structure, they are not visible to the unaided human eye, but can be recognised as such with the help of optical aids. The zones are generally called finder zones 19/20 here. They do not have to be located at the edge of the image. It is also the aim of the invention to create/print finder zones 19/20 with the printing process, which can be found by the process, but which are not visible as finder zones to the unbiased observer.

The identification zone 21 or detection zone, which is used to check the originality of the print, which comprises the actual originality indicator, is located at a selected point in the image and is analysed with pinpoint accuracy. The position of the identification zone 21 or of the tamper-evident indicator can be fixed or can also be coded in the finder marks. The zones 19, 20 and 21 may also be adjacent to each other. The component referred to as the surrounding image 210 may or may not have the same halftone print as the detection zone 21. Essentially, there are at least two finder edges 211 and 212 which are not parallel to each other and which represent the edge of one or more finder zones.

Here, finder edge 211, 212 means not only the line drawn here as an auxiliary line but the existence of adjacent rows of different halftone dots existing along a path, the difference between the halftone dots of the adjacent rows being selected from the group comprising symmetrical halftone dots versus asymmetrical halftone dots, predetermined different halftone angles, AM modulation versus FM modulation.

If necessary, the tasks of finder, alignment marker and originality indicator can be combined. One such possibility is for example FIG. 3B with a chessboard-like coverage of the image with zones of asymmetric 22 and symmetric 23 halftone dot structure alternating both horizontally and vertically. Following the chessboard-like alternation of zones with regularly and irregularly shaped halftone dots, images can be displayed which are composed of a multitude of zones of different halftone dot shapes covering a large part or the whole of the image. For example, starting from two different halftone dot shapes, zones with standard round halftone dot shapes 23 can be assigned the value "0", while zones with asymmetrically constructed halftone dot shapes 22 are assigned the value "1". In this embodiment, it is necessary to normalise the size of a zone to a value whose multiple describes the size of all raster zones; as a result, the bit code 24 arises from the assignment of a partial area with a standard size, for example of 100×100 halftone points, where a partial area 22 corresponds to a 1 and a partial area 23 corresponds to a 0. FIG. 3C shows an implementation of another example with the adjacent bit sequence 25. In the examples according to FIG. 3B and FIG. 3C, respectively, the parity of both zone types is the same, i.e. the number of standardised area elements represented as a square is the same for both halftone dot shapes in both drawings (35 area elements for each halftone dot shape). Other parity values are also conceivable, for example 40 area elements with asymmetrical halftone dots and 30 with symmetrical halftone dots. In addition to the special design of the halftone dot shapes per se, which can be used for the originality check, the distribution of the zones thus offers the possibility of a hidden coding, whereby the parity represents an additional characteristic value that supplements the information behind the hidden coding. Another option of this embodiment is based on a composition of the basic image of zones of three and more different halftone dot shapes, for example round, cross-shaped and irregular, in order to be able to achieve a higher information density through the zone coding in this way.

Figure 3B:
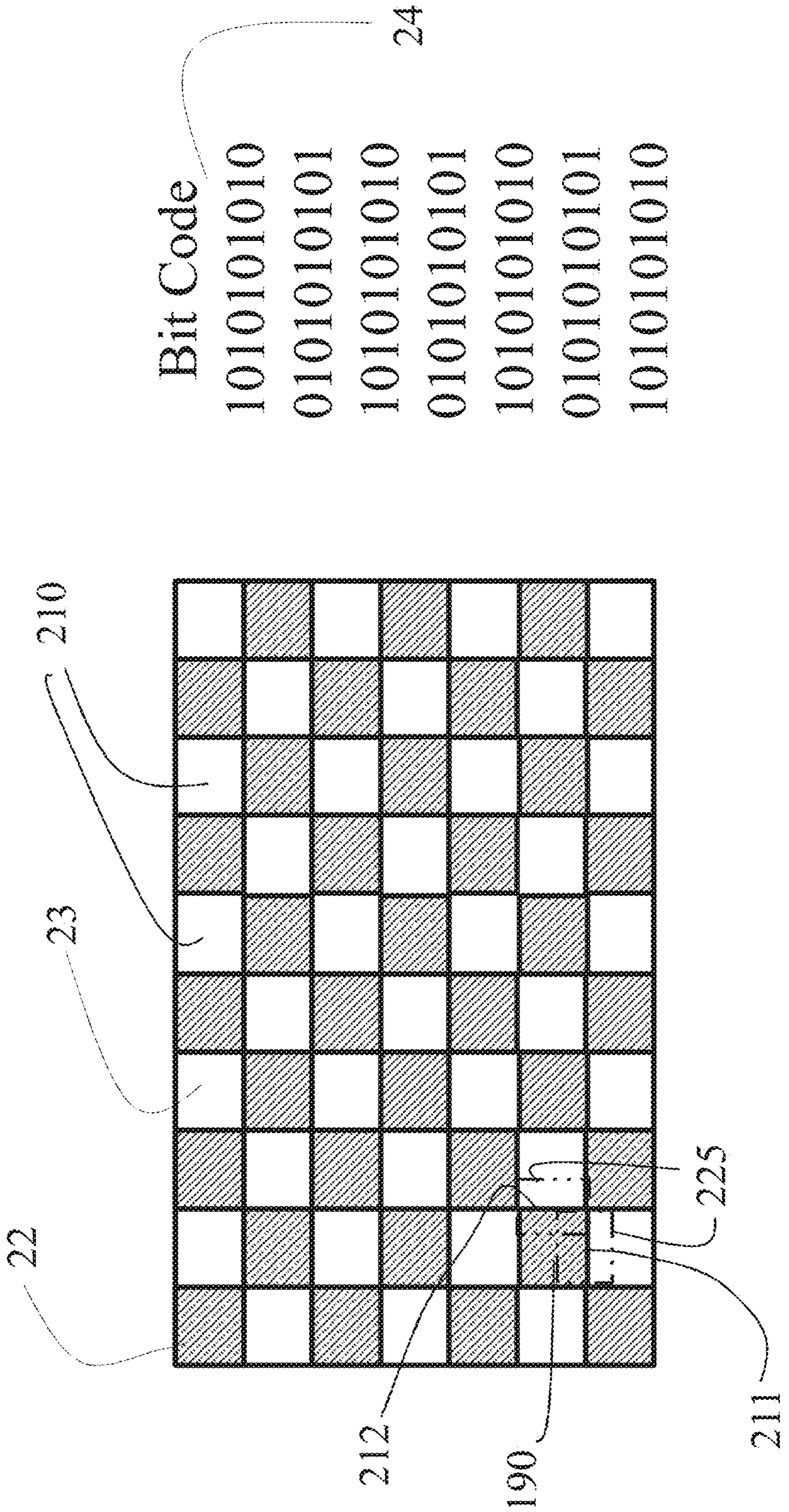
Figure 3C:
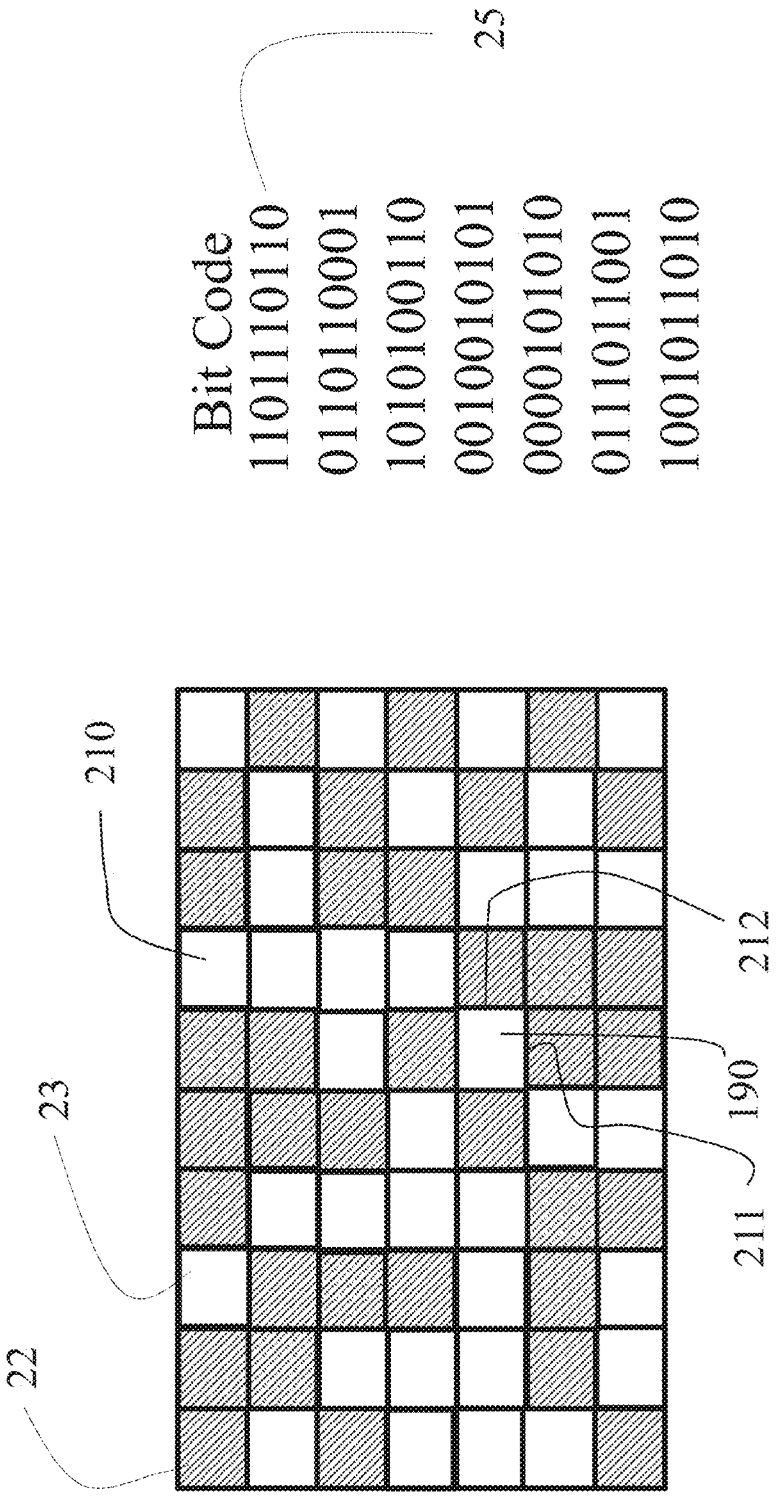

In the embodiment according to FIG. 3B, a finder zone 190 can be, for example, the zone 22 with asymmetrical halftone dot shapes, to which a zone 23 with symmetrical halftone dot shapes adjoins here at the finder edges 211 and 212 respectively. In the embodiment according to FIG. 3C, another finder zone 190 is provided, for example, zone 23 with symmetrical halftone dot shapes, to which zone 22 with asymmetrical halftone dot shapes adjoins here at each of the finder edges 211 and 212. Essential for the detection method is the edge detection by changing halftone dot shapes without this being recognisable in the image.

Essential for this is a grey value in the range of 20% to 80%, or in the case of colour printing a corresponding half-tone value of the printing colour, in particular 25% to 75%, so that the difference in the halftone dot between symmetrical and asymmetrical dots at recorder element level is recognisable for image evaluation. At a higher or lower value, such a finder edge 211, 212 becomes more and more an ordinary edge, which is also recognisable as such by the unaided eye, since then the transition from asymmetrical to symmetrical halftone dot elements is no longer recognisable, but an image component comprises an edge. However, a finder edge is also present if, for example, asymmetrical halftone dots and/or a certain halftone angle are provided on one side of the finder edge, usually in several rows next to each other, and an 80% to 100% grey value print is provided on the other side, possibly in one colour, also in several rows. This is because a symmetrical halftone dot distribution with a grey value of 100% corresponds to a printed edge.

Figure 3D:
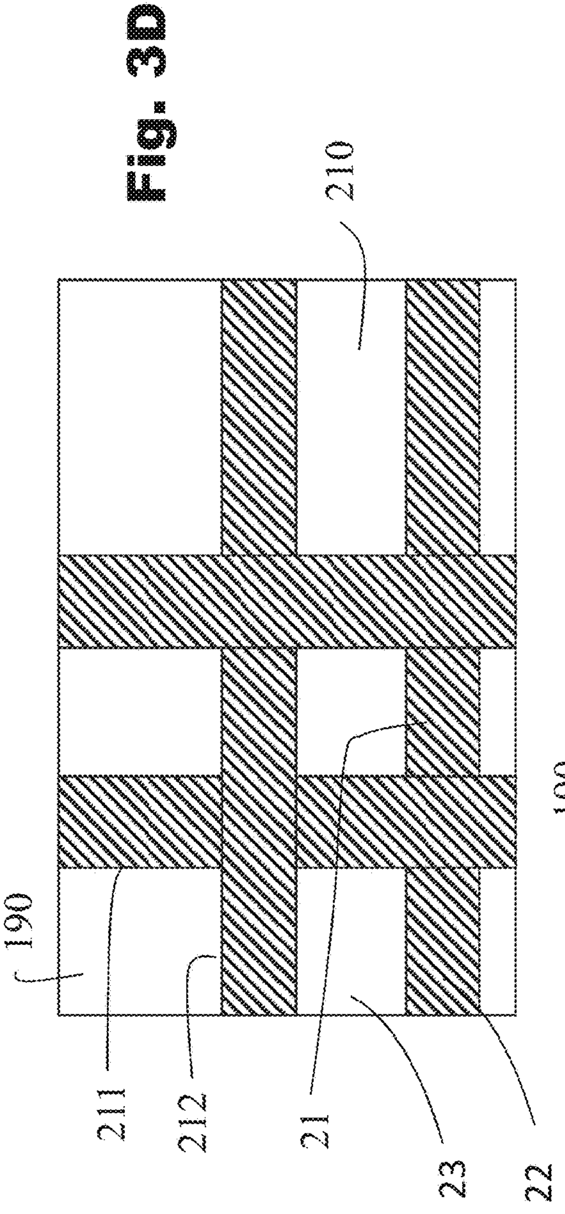
Figure 3E:
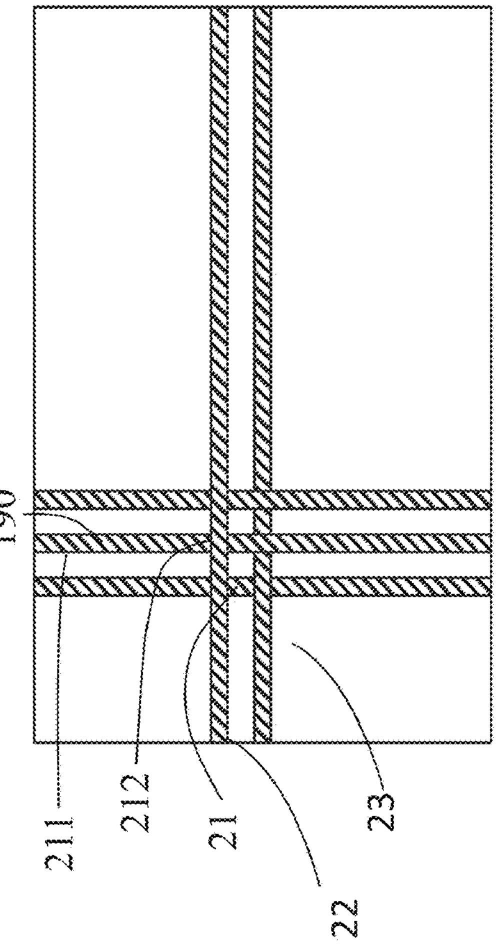
Figure 3F:
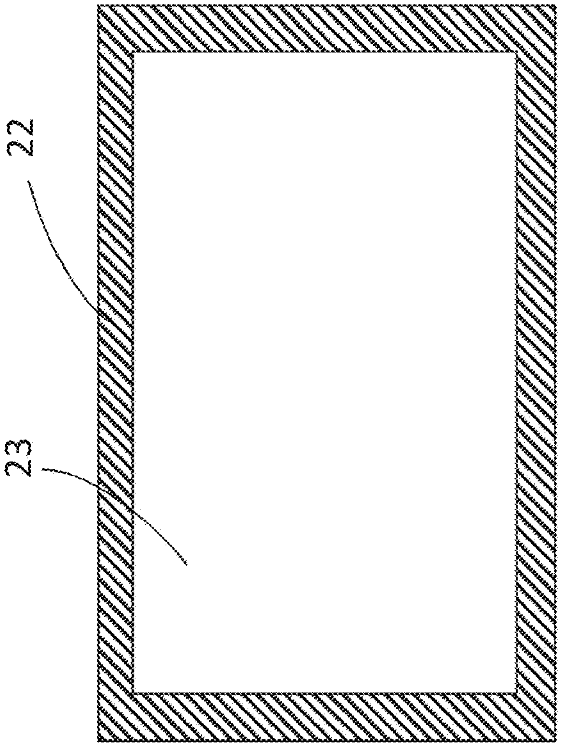

Further embodiments for a combination of zones with halftone dots of different shapes are shown in FIGS. 3D, 3E and 3F, where the same reference signs 22 and 23 are used for the zones with a specific halftone dot shape. This also applies to the other image components 210 and the finder edges 211 and 212. As an example, in FIG. 3D the upper left corner is defined as a finder zone 190 with symmetrical halftone dots, where two finder edges 211 and 212 abut two strips 23 of asymmetrical halftone dots. The area 21 in the lower horizontal strip 22 with asymmetrical halftone dots is provided as a detection zone. The other image components 210 are the other areas of the image. However, further finder edges (not shown here) may be provided to use the double cross structure of the stripes 22 with asymmetrical halftone dots for faster image detection. In FIG. 3E, the upper part of the second strip 22 with asymmetrical halftone dots with the corresponding finder edges 211 and 212 is a finder zone 190 and the intermediate part of the first vertical strip from the left between the two horizontal strips is the detection zone 21. For the skilled person, further finder zones and detection zones can easily be incorporated in the designs of FIGS. 3D and 3E. The strips 22 and 23 do not have to be perpendicular to each other either, but the finder edges 211 and 212 are easier to detect in a perpendicular configuration. The term finder edge stands in each case for a group of at least one, preferably several rows of halftone dots on both sides of this virtual finder edge, whereby the "row" at different halftone angles is not parallel to the finder edge on at least one side, or possibly on both sides, but at an angle to it.

Figure 10:
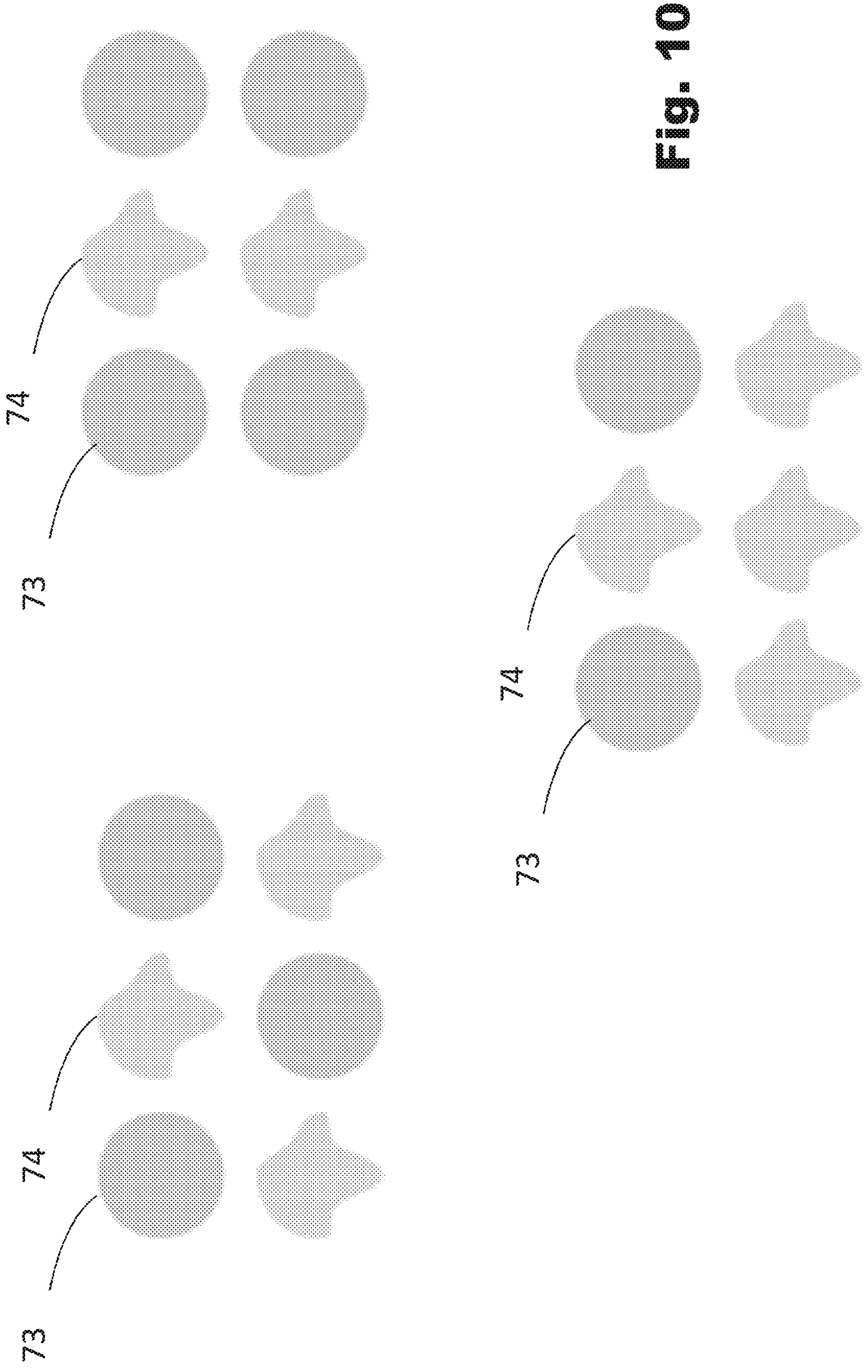

FIG. 2B shows eight image areas 10 with 3×3 halftone cells each. In the extreme case, an identification zone 21 may also consist of a single halftone dot. For example, in FIG. 10, three groups of 2×3 halftone dots of different shapes (regular versus irregular) are shown, each with a different alternating sequence of halftone dots. Regularly shaped halftone dots 73 alternate directly with those having a distinctive shape 74. An artwork according to FIG. 10 provides a known pattern of regular halftone dots over the entire document, which can be digitally recognised as such during image analysis and allows a more precise analysis of the irregularly shaped halftone dots.

Figure 4A:
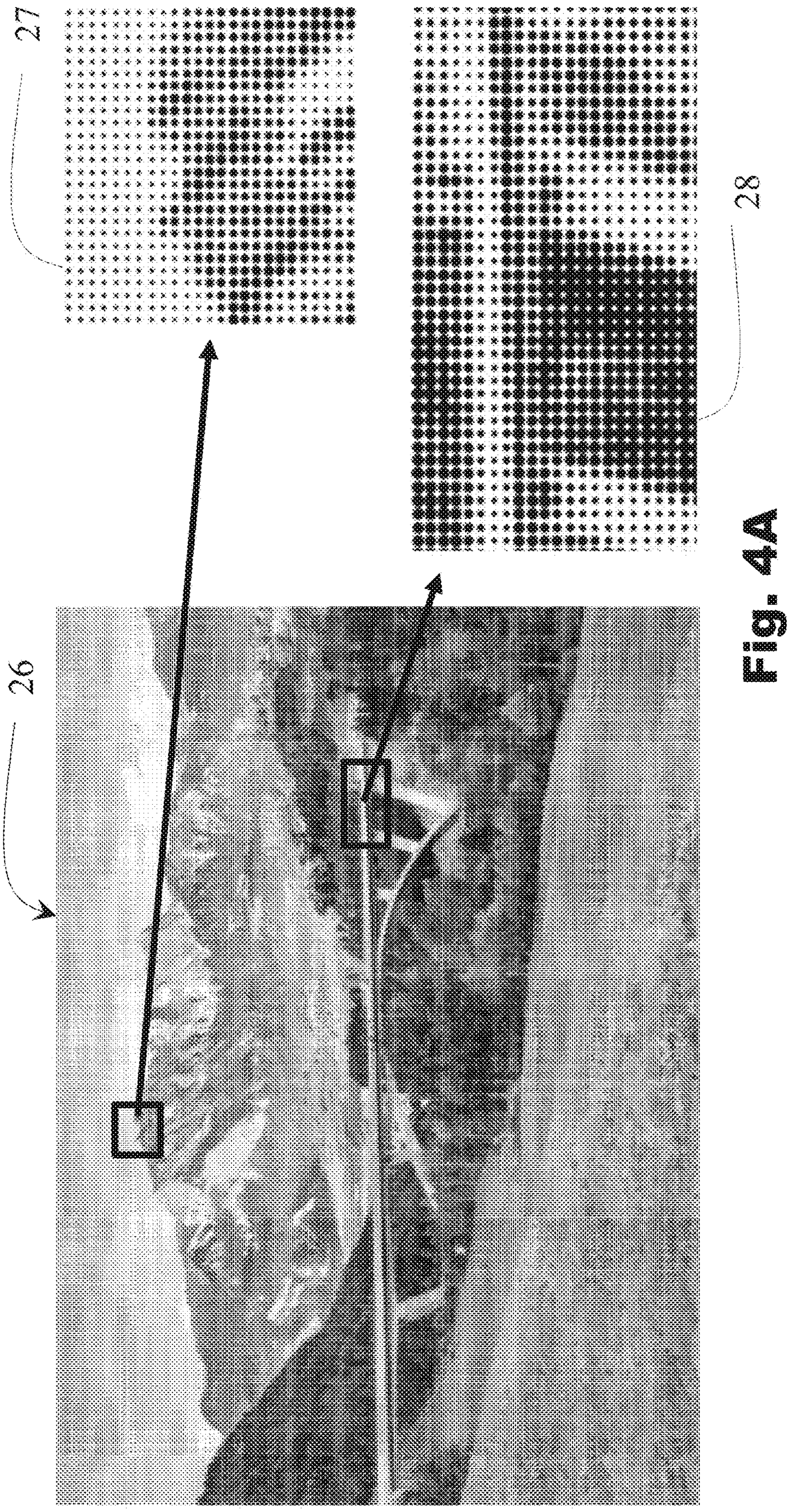
Figure 4B:
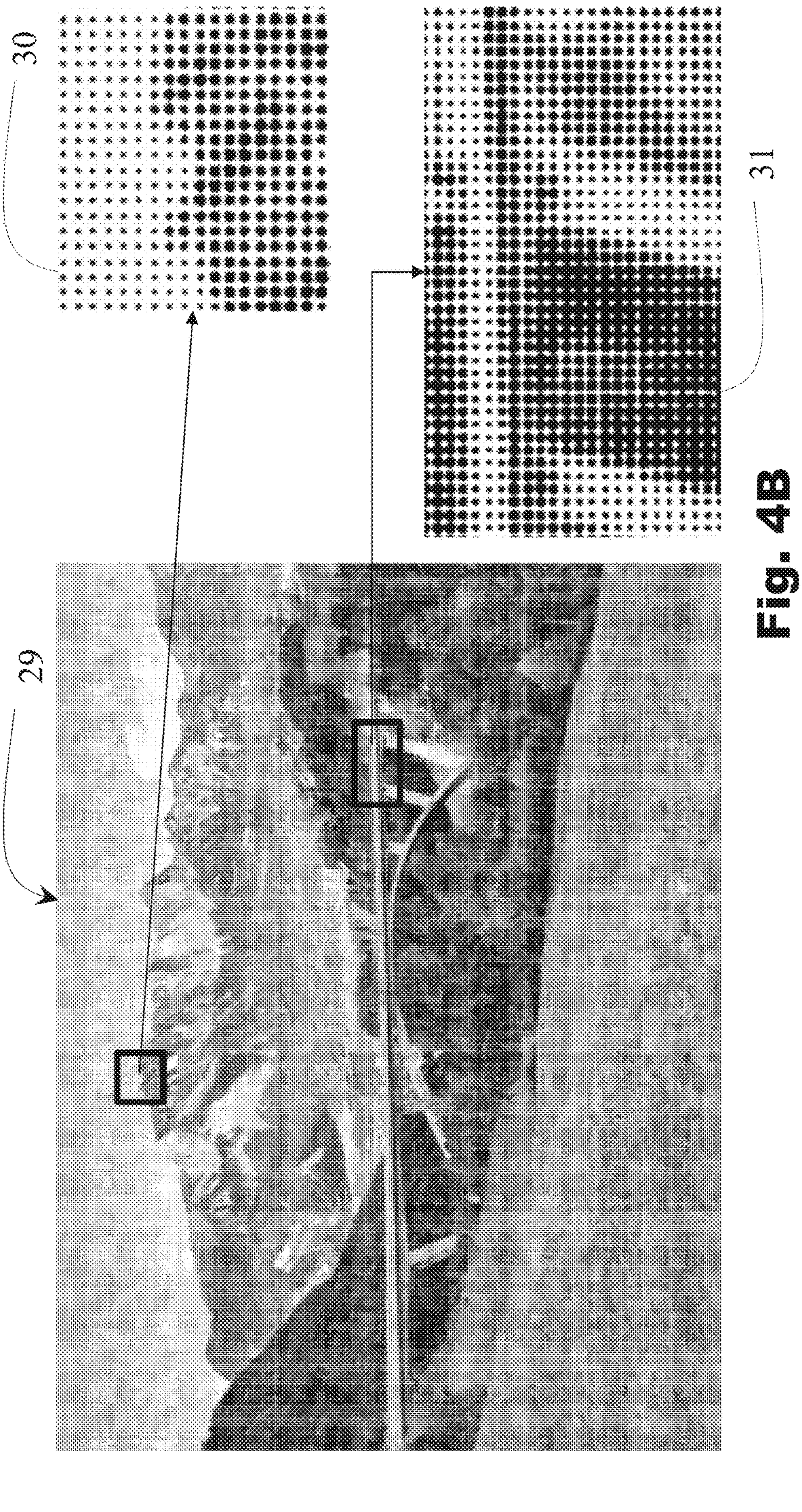
Figure 4C:
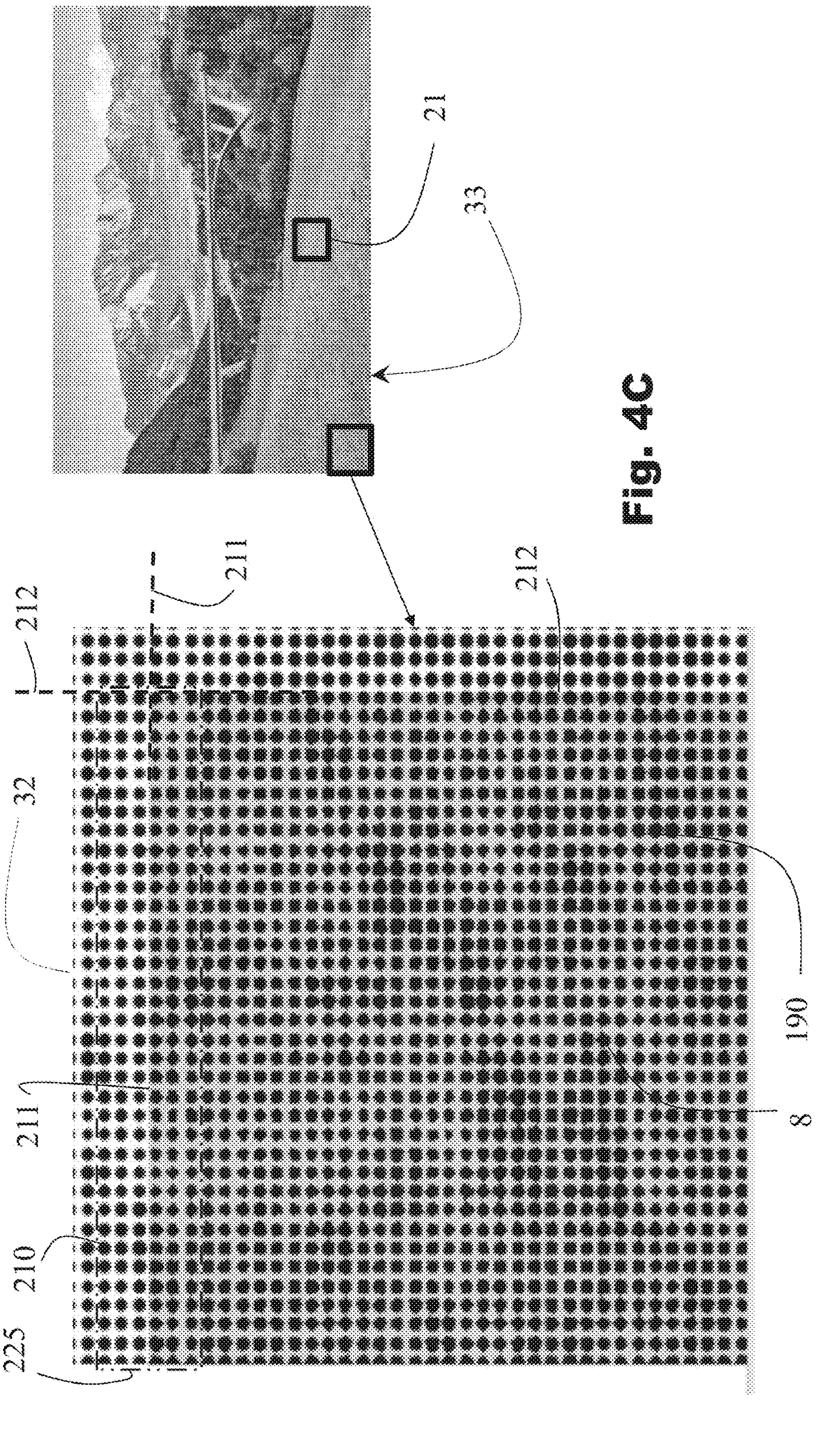

FIG. 4A shows a photographic image 26 with two enlarged image sections 27 and 28. The image FIG. 4A has a relatively low resolution of 40 lines/cm. Higher resolutions, such as 100 lines/cm, are also easily possible for the process according to the invention. In offset printing, a resolution of 80 lines/cm represents a good value for a photographic image, while those of 100 lines and more stand for excellent quality. In FIG. 4A a relatively low resolution was used to better demonstrate the halftone structure. FIG. 4A is a photographic image 26 composed of round halftone dots as shown by enlarged sections 27 and 28. In contrast, FIG. 4B shows the same image as FIG. 4A with a different image structure 29 of asymmetrical halftone dots as shown in sections 30 and 31. FIG. 4C is an image 33 consisting of round halftone dots with a small section in the lower left corner 32 constructed from asymmetrical or irregular halftone dots. This enlarged section 32 from the rasterised image, which overall consists predominantly of round halftone dots, but in the area of the section almost exclusively of irregularly shaped halftone dots, has here a narrow edge of a row of round halftone dots in the section enlargement, which indicates the (different) rasterisation of the overall image. A section of this size and position can be used, for example, as a starting marker for an image analysis. For this purpose, FIG. 4C, like FIG. 4B, has at least one section as detection zone 21, which is drawn here in the area of the meadow. This area 21 then consists, like the area 190, of asymmetrically constructed halftone points. In FIG. 4C, this detection zone can also be the only finder zone 190 here. In this case, this area 190 is both a finder zone and a detection zone.

In other words, the section 32 of FIG. 4C shows a finder zone 190 having two finder edges 211 and 212 perpendicular to each other, the finder zone 190 consisting of asymmetrically formed halftone dots and thus adjoining with its edges 211 and 212 the rest of the image 210, which consists of symmetrically formed halftone dots at least in the three rows shown next to the finder zone 190.

The halftone angles of all images FIG. 4A to 4C as well as in the cut-outs are 0°. It is conceivable to represent the halftone dots in the basic image as well as in the sections by different halftone angles, e.g. a halftone angle of 0° for symmetrical and a halftone angle of 60° for asymmetrical halftone dots. It is also conceivable to represent the entire image with the exception of the detection zone by symmetrical halftone dot shapes, in which case the basic image and the sections of the finder zones 19, 20, 190 differ only by different halftone angles. What matters is the difference, which is defined by the fact that the halftone and raster systems in the finder zone 19, 20, 190 must differ from that in the base image 210. The difference in the halftone angle systems is sufficient to distinguish the finder edges 211 and 212 when the halftone dot shape is the same, but the differences may be more noticeable to the unaided eye. If different halftone angles between the base image and the coding parts of the image are used for differentiation, a special assessment is appropriate, because image elements with different halftone angles may visibly stand out from the base image. Experience has shown that this is the case with greyscale images with low resolution. In addition, a change in the colour effect can occur with colour images, as this is always matched to halftone angles and a visible discontinuity can occur when the halftone angle is changed. However, the conspicuousness depends, among other things, on the motif and the selected image sections.

Figure 5A:
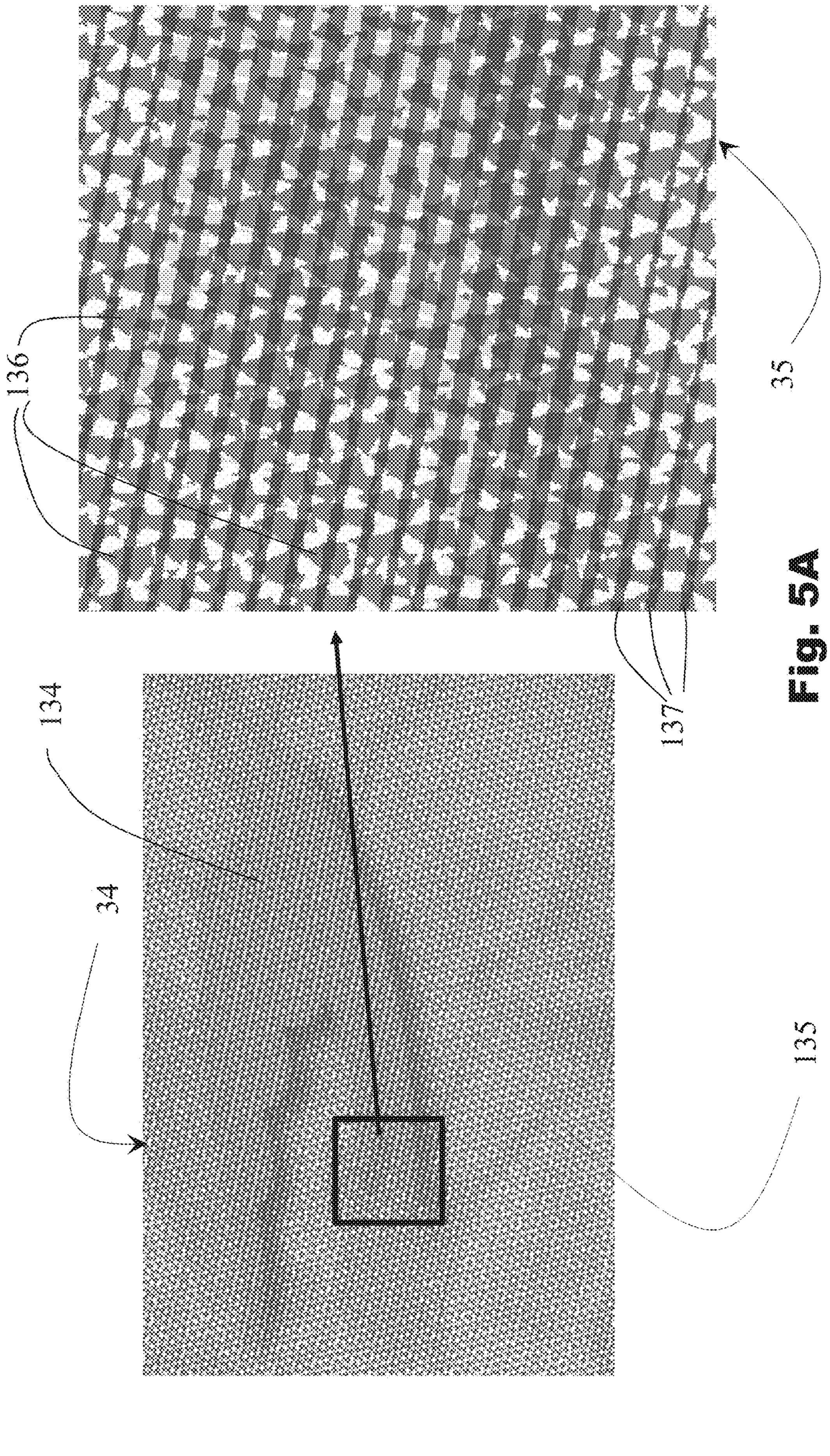

FIG. 5A shows an originally coloured image 34 in which a yellow object 134 is embedded in a substantially blue background 135. Here, "background" means that the viewer sees the object 134 against this background. In printing terms, however, this background 135 is dominated by the halftone dot print elements 136, which relate to the temporally last, i.e. the "foreground" print job. Thus, here it is a grey scale representation of a colour image consisting of a cyan and magenta rasterization in the background, and additionally a yellow rasterization in the area of the subject (pigeon). The disclosure relates to the colour representation, whereby the cyan raster forms the uppermost layer and the tree-like shape of the cyan raster dots 136 is clearly recognisable in the enlargement of the image section.

Figure 5B:
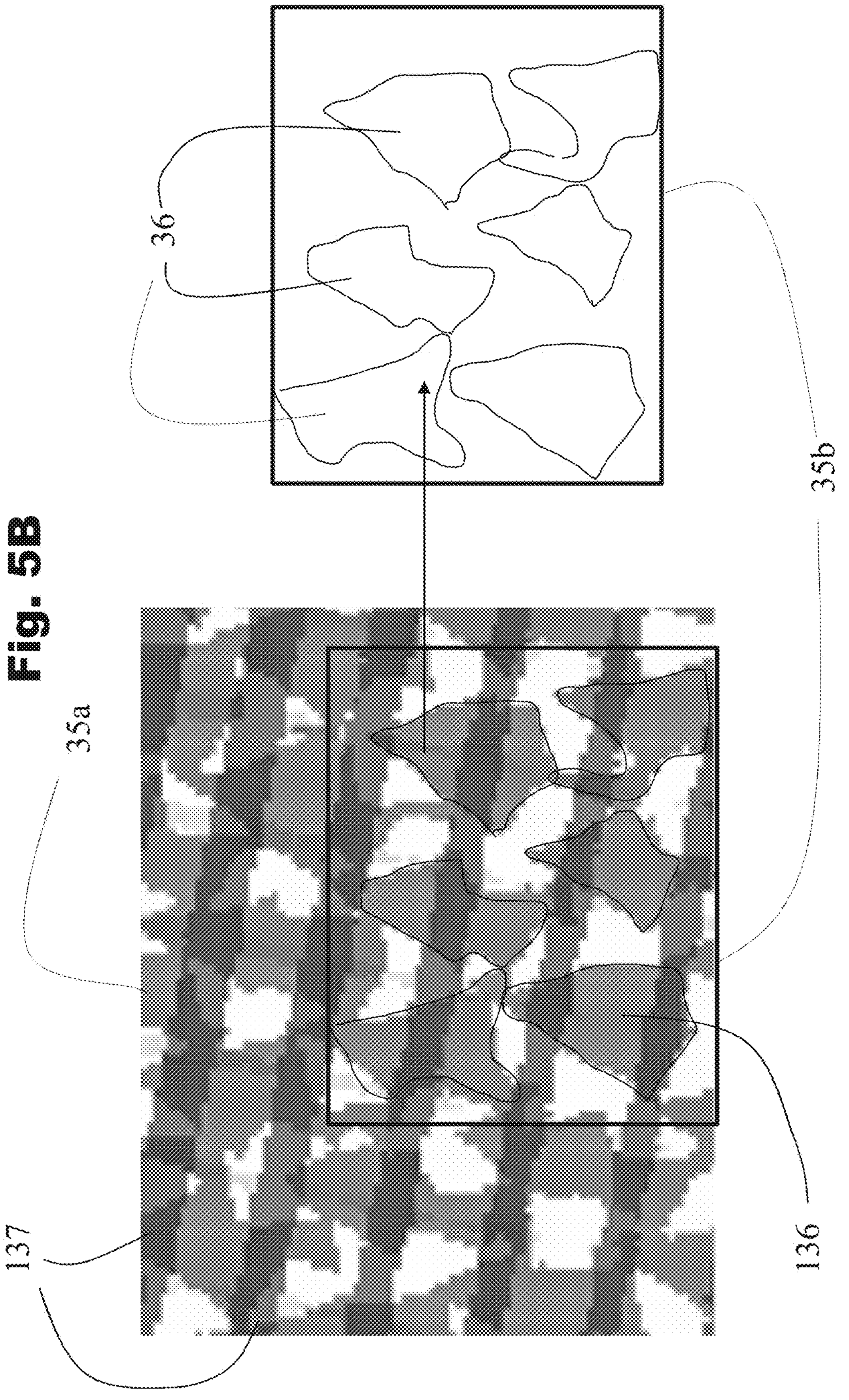

The advantage of an approach to changing colour spaces is easier recognition by an image-recording system, especially at low resolutions. The principle presented above of distinguishing halftone dot shapes of a basic image from halftone dot shapes of certain other parts of the image consisting of halftone dots of other geometry is illustrated in connection with FIG. 5A. Outside the motif of the stylised bird, the image 34 shown is composed of the colours magenta and cyan, cyan being the overlying colour layer. The underlying colour layer consists of a magenta line rasterization 137. The image of the bird also contains yellow as the lowest colour layer, the halftone dots of which are less suitable for image analysis. It can be seen, especially in detail 35, that the uppermost layer, cyan, has an independent geometry of the halftone dots that is clearly visible at the microscopic level (here essentially halftone dots that look irregularly shaped). Further enlargements of the section 35 in FIG. 5B—marked with reference signs 35*a*, on the left, and 35*b*, as part of 35*a* on the right—clearly demonstrate the distinct shape of the cyan halftone dots, with individual ones denoted by reference sign 136, with a contour drawing of the cyan halftone dots 36 shown in a separate section 35*b* alongside the section of the grey scale representation 35*a* for clarity. In other words, the halftone dots of at least one colour from multiple colour layers has the independent geometry.

The printout of a scan from this print will have a further deformation of the halftone dots on top (=the last printed colour layer) and thus be recognised as a copy with the help of digital image capture devices in conjunction with dedicated software. The original print itself is produced from a digital image template and develops in the course of the printing process due to the influences of the printing process, the colour and media properties in a predictable or predeterminable way to a printout that is like a fingerprint of the original.

Figure 6A:
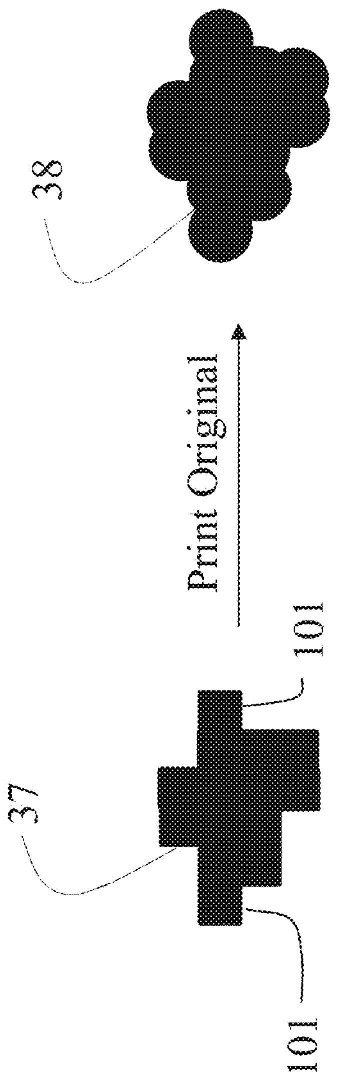
FIG. 6A a digitally specified halftone point and its original printout.
Figure 6B:
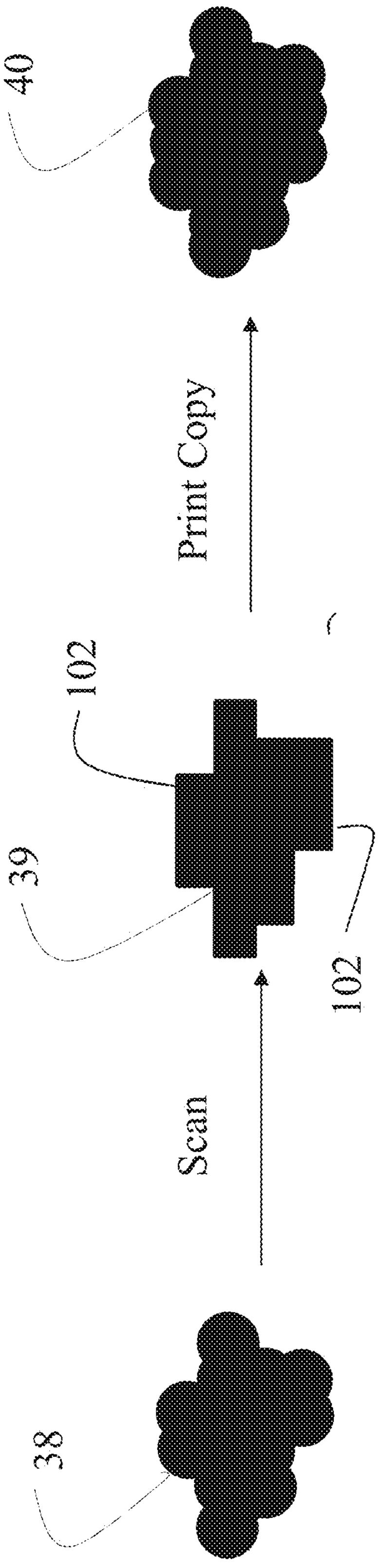
FIG. 6B an original printout of a digitally specified halftone dot, its scan and its reprint from this scanned copy, FIG. 7 a representation of the imaging of halftone points by a camera, in particular a smartphone camera, FIG. 8A a flow chart of the comparison method based on a digital print template and a comparison printout, FIG. 8B an auxiliary method to improve camera resolution, FIG. 9 a comparison of the halftone cell size of a halftone dot versus the resolution of a 12MP smartphone camera and the application of resolution enhancing techniques, FIG. 10 three groups of 2×3 halftone dots, each with a different alternating sequence of halftone dots, FIG. 11 an image recognition process in three levels.

The printing steps which lead to the results "original" and "copy" in the invention can in principle be described as a process in which, shown by way of example in FIG. 6A and FIG. 6B, a predetermined clearly outlined FIG. 37, a halftone dot, is blurred in its shape during printing to form a print dot original 38 and, after a scan of this print dot original 38, is converted into a new digital halftone image 39 which, after renewed printing, undergoes further blurring in the resulting copy 40. In a first step towards recognising the original print, it is advantageous if the extent of the contour resolution of the halftone dots of the digital original can be predicted on the basis of a mathematical model, in order to be able to carry out an image-analytical comparison with a smartphone.

The digital master refers to the raster data for printing form production, e.g. the files for the laser imagesetter in offset printing. The corresponding files contain all data about the structure of all halftone dots of a colour separation of the image to be printed. Ideally, each halftone dot consists of groups of square pixels, which in their entirety form a halftone dot. The transfer of the ink to the printing medium, for example a coated cardboard, is a physical process in which various influencing factors based on the rheological properties of the ink used and properties of the printing medium as well as the process control, e.g. the amount of ink applied, lead among other things to a deformation of the halftone dot.

The deformation of a halftone dot under given printing conditions can be described with a point spread function (PSF, also called blur kernel). Known point spread functions are based, for example, on a two-dimensional Gaussian smoothing or mean filtering of neighbouring pixels. A dot spread function describes the printed image as a function of all the essential printing parameters, in particular the flow and drying behaviour of the ink, the ink absorption of the medium and the process control. It is advantageous to train the mathematical model 48 for the soft drawing of the halftone dots for predefined printing conditions 49. The predefined conditions are, for example, the type of cardboard used, the ink and specifications for the guidance of the printing press, for example the ink application. It is particularly advantageous if the mathematical model is trained for each subject, for example image motif on an original packaging for a specific brand product. Such a trained model 50 for the dot gain on an original packaging produced with a printing process certified for the model advantageously serves as a standard for verifying the originality of a packaging, which can be performed with a suitable image capture device (smartphone) and dedicated software at any time and any place.

FIG. 6A demonstrates an example of the widening and deformation of a halftone dot due to the printing process during the production of the original print.

Figure 7:
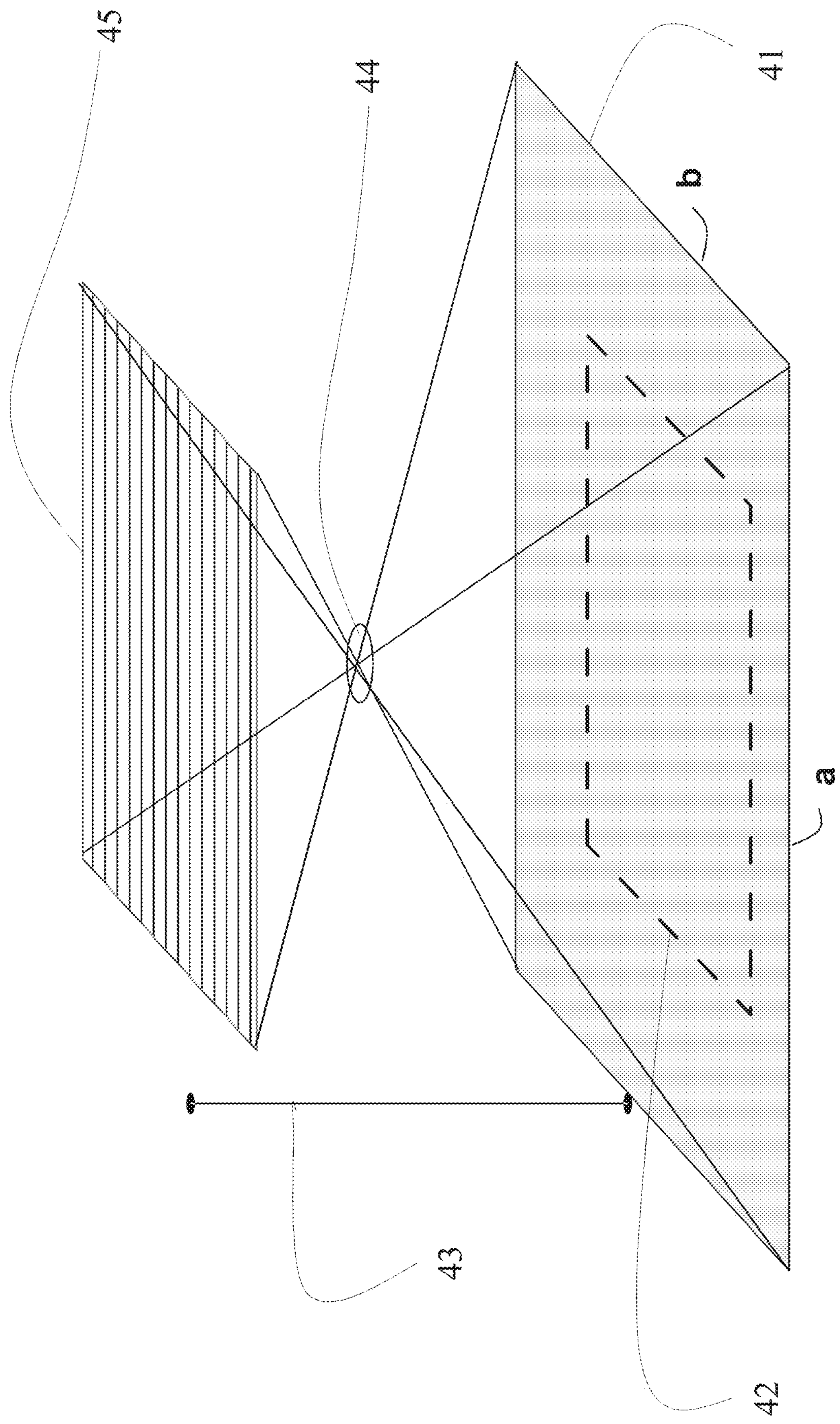

For authentication, requirements are placed on the image-recording system in terms of hardware and recording methods that allow resolution down to the size of a halftone element, i.e. the smallest printing part of a halftone dot. An image printed by the offset process is considered a high-quality print if the halftone has a frequency of 80 lines per centimetre or finer. 80 lines/cm corresponds to a size of 15.6 μm for a halftone element. It can be shown that capturing a halftone element of this size with a conventional smartphone camera in one shot is not feasible. FIG. 7 shows the imaging ratios of a camera with respect to an image to be captured. For example, a sensor 45 of size 1/1.8 inch with an aspect ratio of 4 to 3 can achieve a resolution of 9310×7000 pixels or 65 megapixels. For simplicity, only lines are shown for the sensor in FIG. 7. These are values that an upper-class smartphone can achieve according to the current state of the art. If one further assumes that a smartphone camera must have a certain distance 43 from the print medium 41 to be inspected in order to produce a sharp image of the image section 42 to be analysed, for example 130 mm×98 mm, then this resolution amounts to a pixel pitch of approx. 14 μm. Such a pixel pitch allows a size of 0.112 mm for a raster cell, provided that it consists of a matrix of 8×8 raster elements. A raster or halftone halftone cell of this size allows a halftone frequency of 90 lines/cm, which is sufficient for high-quality offset printing or high-resolution flexographic printing. These are preferred processes for packaging printing. However, imaging a rasterization frequency of 90 lines/cm is not possible with a sensor of the same pixel frequency. According to the Nyquist-Shannon theorem, the scanning frequency must be at least twice the image frequency. This condition of the signal theory according to the above example amounts to a specification of 18'620×14'000 corresponding to 260 megapixels. This is a value that is not achieved by currently common cameras in smartphone format. A size of approx. 100 megapixels still represents a limit value for commercial camera systems. For mid-range smartphones, which are mainly used by consumers, 12 megapixels are common. This makes it impossible to carry out an optical analysis of halftone dot shapes using a classic image capture with a simple smartphone. The limits of the resolution of the cameras of mobile phones do not apply to dedicated camera systems with high-resolution full-format and medium-format sensors in combination with macro lenses or repro lenses with the imaging ratio of 1 to 1 or larger. Some of these have resolutions of 60 megapixels to 100 megapixels, which leads to pixel distances of less than 4 μm at an imaging ratio of ital.

As image capturing devices, these smartphones are used for a preferred image analysis of a rasterised image according to the invention with such typically 12MPixel smartphone cameras, on the other hand, with the support of super resolution (Super Resolution) and/or mathematical deconvolution methods (Deconvolution), which are also used for applications in astronomy and microscope imaging, among others. Super resolution has long been state of the art (see e.g. Borman et al, Super-Resolution from Image Sequences, Department of Electrical Engineering, University of Notre Dame, 1998). For image enhancement based on Super Resolution, software is available for consumer and less professional applications, such as Chasy Draw IES or Topaz Gigapixel AI.

Super-resolution and deconvolution methods, see e.g. "Pragmatic Introduction to Signalprocessing", Tom O'Haver, Department of Chemistry and Biochemistry, The University of Maryland at College Park; available at https://terpconnect.umd.edu/~toh/spectrum/TOC.html, essentially use multiple images taken under conditions that are roughly similar but differ only slightly or moderately in one or more of these conditions. From these differences, information about the fine resolution is derived. The goal of such a procedure could be either a high-resolution image or the direct measurement of high-precision features on a low-resolution image. Scene content, focus, exposure, position and movement of the smartphone affect the outcome of these methods.

Figure 9:
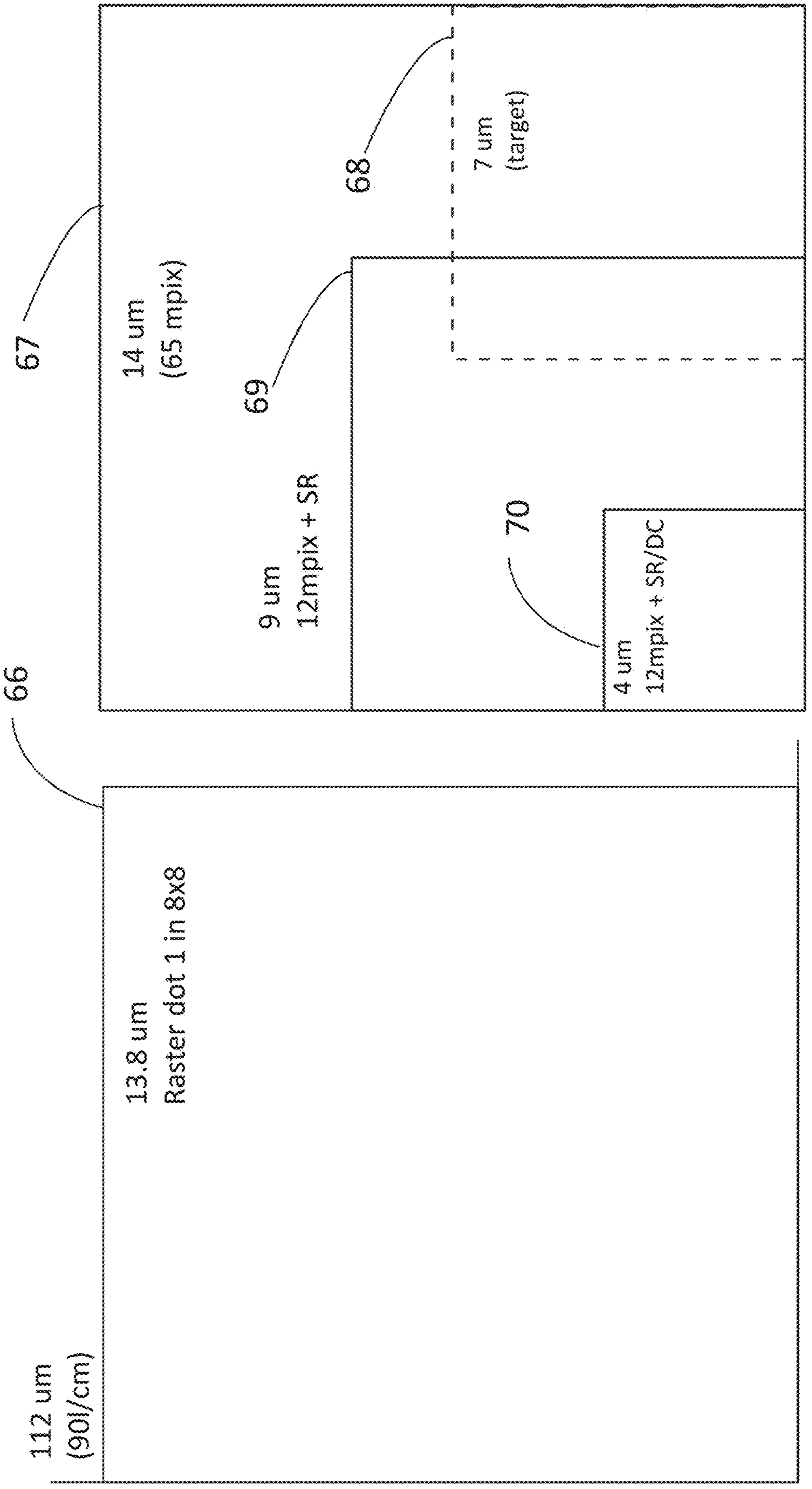

As shown in FIG. 9, the raster frequency results in the size of a raster cell 66, which, for example, at a frequency of 90 lines/cm in the case of a raster cell of 8×8 raster elements, amounts to a size of 14 micrometres. The resolution of the image capture chip of a smartphone 67 with a resolution of 65 MP is about 14 micrometres, which is not sufficient for scanning or sampling a raster element size of the same size. Sampling would require a resolution corresponding to a pixel pitch of the sensor of 7 μm, which is indicated by the square 68.

A super-resolution method generally achieves a 2-4-fold increase in resolution, which in the case of a 12 megapixel image amounts to about 9 microns for sampling a raster element 69. Deconvolution methods follow a similar approach but assume very blurred images taken from closer range. A combined use of super-resolution and deconvolution can result in an 8-fold increase in sampling frequency compared to a normal image taken from the usual minimum near limit, achieving about 4 microns of resolution 70 to measure point features. Thus, depending on the camera model used or to be used, the comparison can be made directly, after applying a super-resolution method and/or after applying a deconvolution method.

Based on this approach, that it is necessary for a number of cameras, in particular smartphones, to use a quality improvement that results in a higher resolution, the authentication of an image is made possible here with the help of a short video sequence or a series of individual shots of this image, for example executed by a smartphone with a 12 megapixel camera, using a suitable Super Resolution Algorithm 56. A sensor of a common smartphone in combination with a Super Resolution Algorithm is sufficient for this purpose. Alternatively or additionally, one can also use a deconvolution method, which is integrated in Matlab and Octave, for example.

The starting point of each of these methods is the acquisition of several images with some fixed parameters such as the resolution and the light output, where some parameters cannot be influenced or are unknown. First, the position of the smartphone is given by a guidance with the hand, which leads to a movement in X, Y or Z direction with a speed of some mm/s, resulting in an offset of 60 μm for a movement of 1-2 mm/s or a movement of 1-3 pixels/s in the image plane. Ambient light also has an influence, especially some types of neon light. The resulting images will therefore differ slightly due to a small shift and the lighting conditions. Shutter speed can also cause camera shake and thus blur.

Figure 8A:
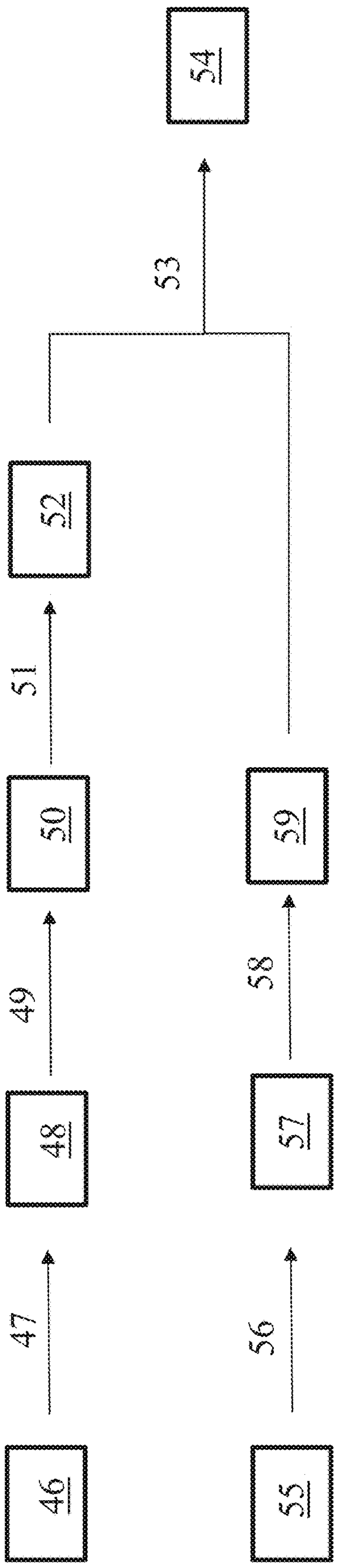

FIG. 8A shows a flow chart of the process for determining a copy without taking into account the auxiliary processes for increasing the resolution (i.e. in particular the above-mentioned Super Resolution and/or Deconvolution processes), starting from the artwork (i.e. the digital template) 46 generated in the pre-print stage. From this artwork 46, a soft-drawn model 48 is developed, which is parameterised with the data of the print substrate (cardboard, paper, etc.), the printing ink, print guidance, etc. and, optionally, trained with original prints or print proofs in order to obtain an optimised version of the original model 48. Compared to the untrained model 48, the trained model 50 provides a better basis for comparison (matching template) for a more robust image analysis of a selected section of the print image to be tested. A matching 53 of template and the data set of the image to be authenticated leads to the statement “original” or “copy” after applying a quality matrix 54.

The matching template 52, which is a quasi normalised version of the original print, can for example be formally described by nodes and edges according to geometric graph theory, which is described by the reference signs 51, 52. However, other approaches are also possible to characterise the template. For example, a content fingerprinting method according to EP 2 717 510 B1 is also suitable.

In the case of the graph-theoretic approach, a print 55 to be inspected, which may be a copy, is translated into a data set 59 with the same architecture as the template 52, like the digital template or original, using a graph algorithm. In the extreme case, the mathematically formalised equivalent of the halftone pattern corresponds to a dense network of nodes aligned with the halftone dots of the print image.

Figure 8B:
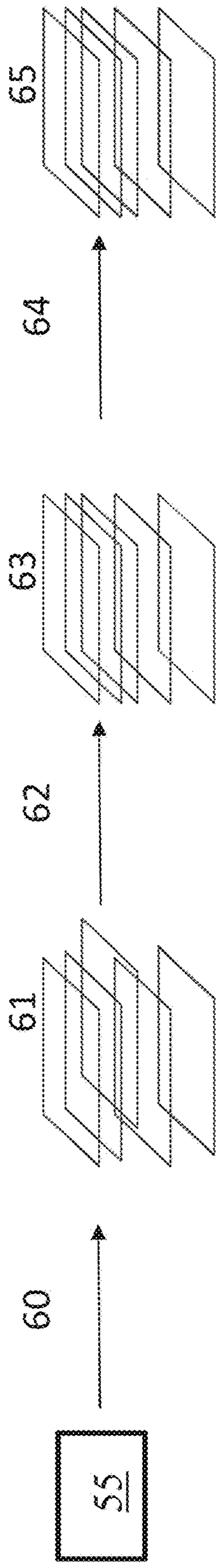

Taking into account the auxiliary procedures to increase the camera resolution, a sequence of single shots or a video stream according to FIG. 8B is required.

The print 55 under test is captured with different camera parameters 60. By varying the focus in non-equidistant steps, the analysis reveals the critical differences of the halftone dots by deconvolution of the blur of the video stream (which is analysed as single frames). Likewise, the variation of the exposure time serves to reveal microscopic pressure peculiarities, compensating for the light differences coming from the 50 Hz light source. The result is an image stack 61. The method calculates the alignment from several individual images 62 to obtain an alignment vector field 63, which forms the basis for image synthesis with high resolution. Estimates are also obtained in a similar manner for parameters that vary between images, such as lighting conditions. Then processing 64 of the aligned images is performed to obtain results 65. A mathematical representation is generated for a high-resolution image that can be compared to the matching template 52.

The process of aligning the individual images begins with a reasonably register-accurate superimposition of the individual images, which is a simple step even with blurred images. In the next step, information about the exact position of the process-oriented halftone dots flows into the process. Here, the position of the process-oriented halftone dots must be known at different points in time. In the case of alternating halftone dots of regular (process-oriented) and irregular shape, an attempt can be made to align a smaller part of the image with a shift of one pixel once in x and once in y until an alignment with correct process-oriented halftone dots is found. An alternating pattern defines how many processes need to be executed. Therefore, regularly shaped halftone points favour the unfolding process.

Figure 11:
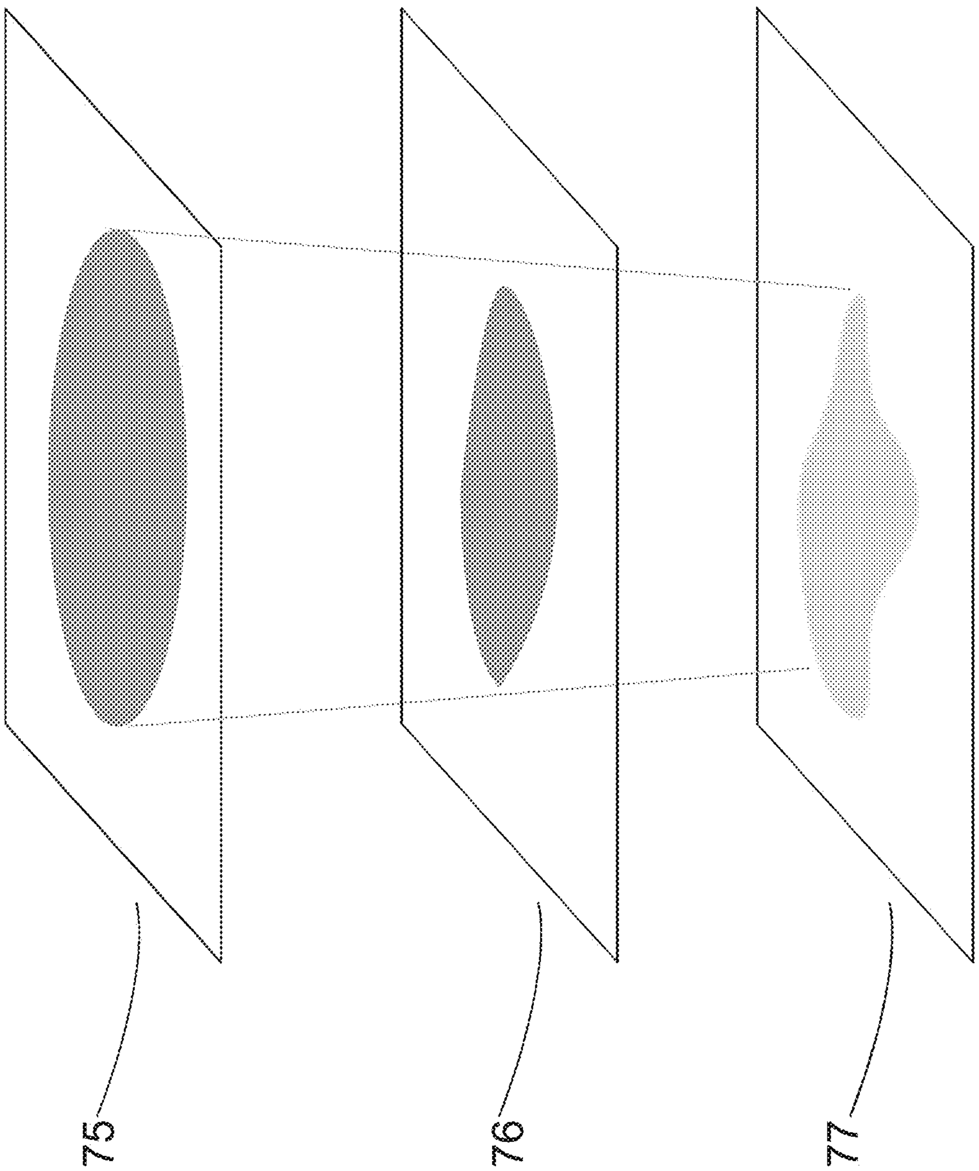

The process of image recognition is shown in FIG. 11, where processing is applied to aligned macro-level images 75 to gradually obtain an intermediate version 76 and, at the end, a high-resolution version 77. The quality of the process is measured by the correspondence with a known reference pattern of regular shaped halftone dots at the highest resolution. This measurement is based on the correspondence between the current status of the processing and the nature of the template.

A regularly shaped border of halftone points favours the estimation of the position in the blurred image, as only one edge from left to right (from background to foreground) is taken into account, which is easier to implement at comparison level.

Another embodiment is that edges 80 of the halftone dots in the direction of a rasterization line tend to form a channel that is as straight as possible. This effect leads to an increased geometric stability of the raster image in a preferred direction, which can be used for alignment of the raster image.

Halftone points can thus advantageously be modelled in such a way that they provide information for the orientation of the halftone image and the coding of the originality, respectively.

In principle, it is possible for the deconvolution process used in the present invention to restore the shape of the halftone dots defined in the pre-print artwork, i.e. to reverse the softness caused by printing. This is a reverse operation to the convolution of the image information, which manifests itself as the softness of the halftone dots. A comparison of halftone images with halftone dot shapes resulting from deconvolution can be made with various mathematical descriptors, e.g. on the basis of centroid distance functions, area functions, chord length function, the use of quadratic shape matrices or curvature-based scale spaces, etc.

Figure 12:
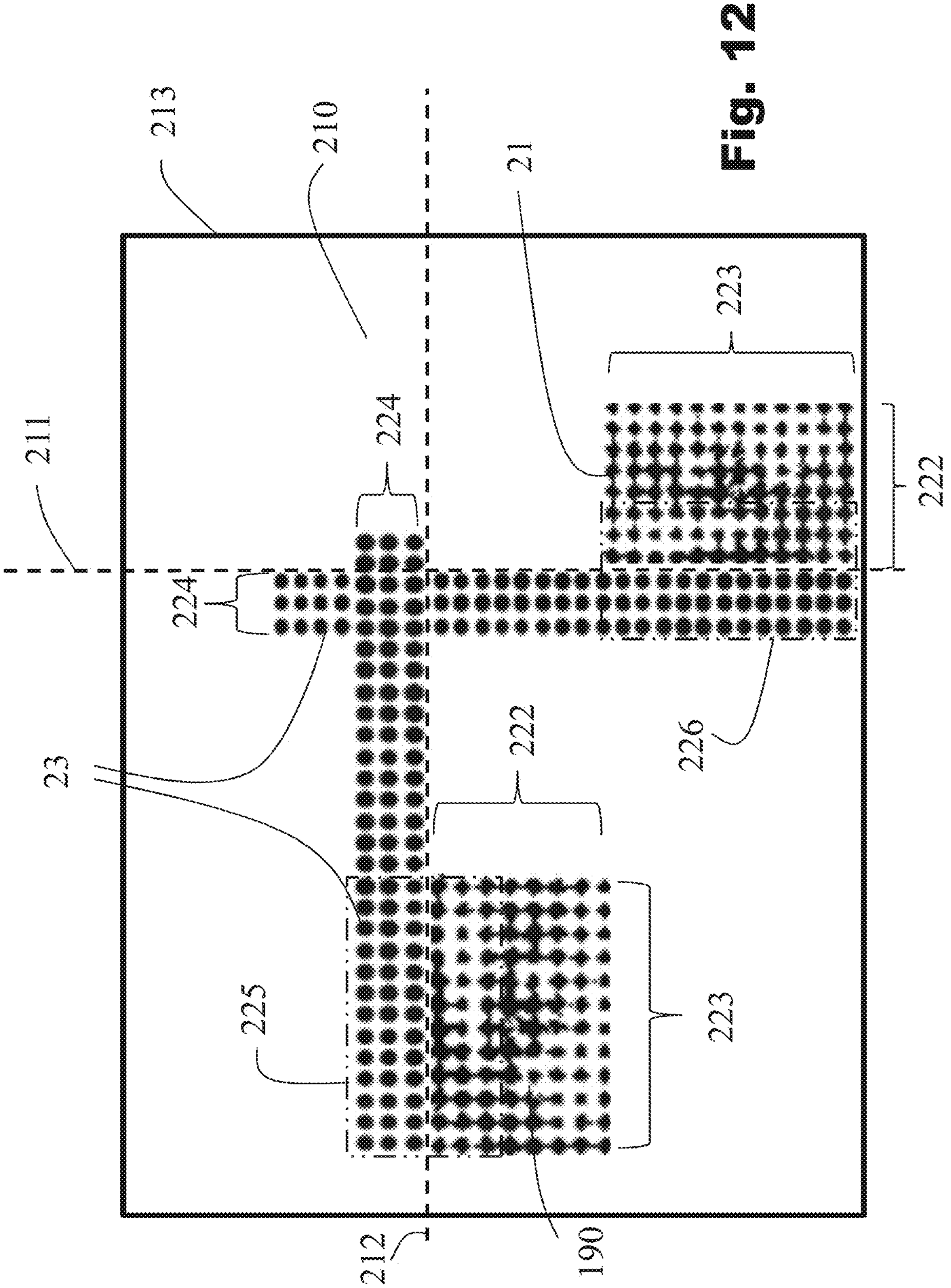
FIG. 12 a schematic representation of an image with individual zones and finder edges.

FIG. 12 shows a schematic representation of an image 210 with individual zones and finder edges 211, 212, wherein an optional border 213 is shown which is not usually provided and which here is only intended to symbolise the border of the image 210 shown "empty".

FIG. 12 shows a simple version of the definition of finder edges 211 and 212, which are shown as dashed lines. a finder zone 190 and a separate identification zone 21 are shown as zones.

The finder zone 190 has a finder edge row number 222 of eight and a finder edge length 223 of twelve grid points, all of which are asymmetrical and thus form the finder zone 190. In other words, the actual finder edge 212 has, on the finder zone side, a finder edge row number 222 of one to eight with a length predetermined with the finder edge length 223. It has the same finder edge length 223 on the outer image side, since this is predetermined by the limited area, while the finder edge row number 224 is shown here to be selectable between one and three. This results, for example, in a finder edge zone 225 to be evaluated by the authentication method of 12 by 3 grid points on both sides of the finder edge centre line 212. The evaluation does not have to be symmetrical, the row number 224 and 222 can be selected differently.

The identification zone or detection zone 21 has a finder edge row number 222 of eight and a finder edge length 223 of twelve halftone points, all of which are asymmetrical and thus form the detection zone 21. The numbers here are the same as finder zone 190, which they do not have to be. In other words, the actual finder edge 211 has on the detection zone side a number of one to eight finder edge rows 222 with a length predetermined with the finder edge length 223. It has the same finder edge length 223 on the outer image side, since this is predetermined by the limited area, while the finder edge rows 224 are shown here to be selectable between one and three. This results, for example, in a finder edge zone 226 to be evaluated by the authentication method of 12 by 3 halftone dots on both sides of the finder edge centre line 212. The finder edge zone 226 may also end at the edge 213 and this edge may represent a further horizontal finder edge 212 (not shown in FIG.), since the outer image area 210 in the vicinity of the detection zone 21 is symmetrical and the edge is also recognised as symmetrical as a full black edge with a grey tone of 100%. But the detection zone 21 can also be in the inner area of the image. The length or distance of the twelve asymmetrical halftone dots can be detected by the authentication procedure and can be used for the orientation and scaling of the overall image. The more finder edges 211, 212 are used, the easier, faster and more accurate the pixel-precise detection of the detection zone 21 can be achieved.

The finder edge zones 225 and 226, i.e. matrices (arrays) of a width of halftone dots predetermined by the zone and the evaluation method, are also drawn by way of example in FIG. 3B (for both finder edge lines 211 and 212) and in FIG. 4C (for finder edge 211 with a row width of three halftone dots on both sides and a length of thirty-six halftone dots).

In summary, the invention has a large number of individual features, some of which also constitute independent technical gauges:

A method of detecting copies of black and white and colour images, wherein

- the features for identification and authentication are hidden from the unarmed eye,
- in addition to dedicated originality indicators, the orientation marks (position marks, alignment marks, synchronisation marks) are not visible, as shown in FIG. 3,
- a second piece of information is optionally included in the characteristics,
- the features incl. the orientation features are inserted in the pre-print stage,
- the features are based on an intervention in the image raster, as explained in connection with FIGS. 2, 4, 5, 10 and 12,
- the evidence is based on the juxtaposition of groups of halftone dots of different shapes and the washing out of the shape of the halftone dots by the printing process of the original and the copy, as can be seen in FIG. 2D,
- the deformation of the digitally generated artwork by the printing of the original is calculated as a descriptor based on typical algorithms and optionally trained for a suitable model to recognise the original; whereby the basis for this calculation is made on the basis of the properties of the printing ink, substrate or medium such as certain types of cardboard, so that the printer of originals is certified or prescribed the printing specifications accordingly,
- the recognition of original and copy is performed by a portable image capture device with a suitable application program, e.g. a smartphone with dedicated app, wherein a procedure as described in connection with FIG. 8B is performed;
- wherein it is advantageous that smartphones with cameras of average resolution can be used for object recognition, in particular by applying auxiliary methods for resolution enhancement, in particular Super Resolution and Deconvolution, as described in connection with FIG. 8B, FIGS. 9 and 11.

The invention claimed is:

1. A printing method and authentication method for a print to be made of a digital image, comprising:

- a method of printing authentication marks by applying an amplitude modulated halftone print in a detection zone to an object, wherein the detection zone has a printed area comprising contiguous halftone cells in each of which a halftone dot is printed from a matrix of printable halftone elements, wherein in a predetermined manner for a plurality of tone values of halftone dots to be printed, with a constant tone value of the print, a predetermined asymmetrical matrix image is assigned for a Re print image arising from print data of the halftone elements to be printed, wherein at least two finder edges, which are not parallel to one another, from at least one finder zone are printed to determine a position, boundary and orientation of the detection zone, and
- a method of authenticating a print on a printed article, comprising providing a portable image capture device having a microprocessor for executing an authentication program, providing the print image predetermined from the print data and resulting therefrom for a predetermined number of halftone dots of the printed article from a detection zone, and providing a computer program for comparing the print image predetermined from the print data of the halftone dots; said method comprising the further steps of capturing an image of the printed article providing a captured image; detecting the at least two finder edges from the at least one finder zone to define the detection zone with halftone dot accuracy from the captured image of the printed article; comparing the captured image of the detection zone with the print image predetermined from and resulting from the print data; and deciding on the basis of the comparison whether or not there is an original print on the printed article.

2. The method of claim 1, wherein each finder edge along a predetermined path of the printed image consists of a finder edge zone of adjacent rows of halftone dots on either side of the finder edge, wherein between the halftone dots of the adjacent rows, a difference is selected from the group consisting of symmetrical halftone dots versus asymmetrical halftone dots, predetermined different halftone angles of the halftone dots, AM modulation versus FM modulation of the halftone dots, the difference being predeterminable from the group to be independently different or the same for each finder edge.

3. The method according to claim 1, wherein the finder zone defined by one of the finder edges has asymmetric halftone dot shapes, wherein the halftone dots existing beyond said finder zone on another side of said finder edge each form a zone with symmetric halftone dot shapes from a remaining printed image.

4. The method according to claim 1, wherein the finder zone defined by one of the finder edges has symmetrical halftone dot shapes, wherein the halftone dots existing beyond said finder zone on another side of said finder edge each form a zone with asymmetrical halftone dot shapes from a remaining print image or from the detection zone.

5. The method according to claim 1, wherein the finder zone defined by one of the finder edges has symmetrical halftone dot shapes with a first halftone angle, the zones beyond said finder zone on another side of said finder edge each having a second halftone angle from a remaining print image or from the detection zone.

6. The method according to claim 1, wherein the predetermined number of halftone dots in the detection zone is divided into zones with asymmetric and symmetric halftone dot structure, said zones being arranged in a matrix of at least two rows and two columns.

7. The method according to claim 1, wherein a multicolour print comprises a number of colour jobs and wherein the asymmetric halftone dots are provided in one of the last two colour jobs.

8. The method according to claim 7, wherein the finder edges are provided by defining halftone dot shapes and/or halftone angles of an identical or a different colour layer.

9. The method according to claim 1, wherein the asymmetric halftone dots have a grey tone value between 25% and 75%.

10. The method according to claim 1, wherein at least two finder edges are meeting in a corner point of a finder zone.

11. The method according to claim 1, wherein the finder edges of one or more finder zone(s) are provided at an edge of the printed image or in at least one pair of intersecting finder zone strips.

12. The method according to claim 1, wherein in the method of printing authentication marks by applying an amplitude modulated halftone print in a detection zone, a matching template is generated from print data from the group comprising the data of the print substrate, a print ink and a print guide and having a format.

13. The method according to claim 12, wherein this matching template is trained by original prints and print proofs, wherein the captured image of the printed object is converted in the method for authenticating a conversion of the image by a graph algorithm into the format of the matching template for a direct comparison.

14. The method according to claim 13, wherein capturing the image of the printed object in the method of authenticating comprises capturing a plurality of images with different camera parameters from the group comprising varying focus and varying exposure time to produce an image stack whose data is converted into an aligned image stack, to be subsequently converted into the format of the basis of comparison.

15. The method according to claim 1, wherein the distribution of finder zones and detection zones is provided in a predetermined matrix containing digital information.

16. The method according to claim 1, wherein the detection zone is checked against the comparison basis on the basis of the recorder elements composing the halftone points contained therein, and the comparison comprises a threshold value of corresponding matches of detected recorder elements with the recorder elements of the comparison basis.

17. The method according to claim 16, wherein a plurality of separate detection zones is provided, and either an overall threshold value determined over all detection zones or individual threshold values of the individual detection zones serve as a basis for decision.

18. The method according to claim 1, wherein starting from a digital template of the halftone dots from a pre-print stage, a blurring step is switched on, in which a blurred model is generated from the digital template from data from the group comprising the printing substrate, the printing ink and the printing guide, and is trained with a subsequent training step with original prints or print proofs of the printed model for a trained model in order to create a matching template for an image analysis of a selected section of the print image to be checked, wherein a matching of matching template and a data set of an image to be authenticated after application of a quality matrix provides a statement “original” or “copy”.

19. The method according to claim 18, wherein a print to be verified is translated into a data set having a same architecture as the matching template using a graph algorithm, wherein a mathematically formalised correspondence of halftone pattern corresponds to a dense network of nodes aligned with the halftone dots of the print image.

20. The method according to claim 19, wherein prior to application of the graph algorithm, the detection of a print to be tested is performed by generating a sequence of images with different camera parameters from the group comprising variation of a focus, variation of exposure times and variation of a camera position, wherein an obtained image stack is aligned in an alignment step to obtain an alignment vector field, wherein subsequently further parameters varying between the images from the above mentioned group are determined to obtain a result which is processed with said graph algorithm.

* * * * *